United States Patent
Aoshima et al.

(10) Patent No.: US 9,984,711 B2
(45) Date of Patent: *May 29, 2018

(54) MAGNETIC RECORDING MEDIUM AND COATING COMPOSITION FOR MAGNETIC RECORDING MEDIUM

(71) Applicant: FUJIFILM CORPORATION, Tokyo (JP)

(72) Inventors: Toshihide Aoshima, Minami-ashigara (JP); Wataru Kikuchi, Minami-ashigara (JP); Kazutoshi Katayama, Minami-ashigara (JP); Tatsuo Mikami, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/869,014

(22) Filed: Sep. 29, 2015

(65) Prior Publication Data

US 2016/0093321 A1    Mar. 31, 2016

(30) Foreign Application Priority Data

Sep. 30, 2014   (JP) .................................. 2014-202548
Sep. 29, 2015   (JP) .................................. 2015-191529

(51) Int. Cl.
    *G11B 5/708*    (2006.01)
    *G11B 5/70*     (2006.01)
(52) U.S. Cl.
    CPC .................................. *G11B 5/7013* (2013.01)
(58) Field of Classification Search
    CPC .................................. G11B 5/65; H01F 1/42
    See application file for complete search history.

(56) References Cited

U.S. PATENT DOCUMENTS

2011/0003241 A1 *   1/2011   Kaneko .............. C08G 73/0206
                                                          430/7
2012/0177950 A1 *   7/2012   Omura ................. G11B 5/7023
                                                        428/840.2

FOREIGN PATENT DOCUMENTS

| JP | 61139923 A   | * | 6/1986 |
| JP | 2002-117521 A |   | 4/2002 |
| JP | 2004-67941 A  |   | 3/2004 |
| JP | 2006-092618 A |   | 4/2006 |

OTHER PUBLICATIONS

Human English Translation of JP 61-139923.*
Office Action dated Dec. 20, 2016, from the Japanese Patent Office in corresponding Japanese Application No. 2015-191529.

* cited by examiner

*Primary Examiner* — Holly Rickman
*Assistant Examiner* — Linda Chau
(74) *Attorney, Agent, or Firm* — Sughrue Mion, PLLC

(57) ABSTRACT

The magnetic recording medium comprises a magnetic layer comprising ferromagnetic powder and binder on a nonmagnetic support, and further comprises a compound denoted by Formula (1):

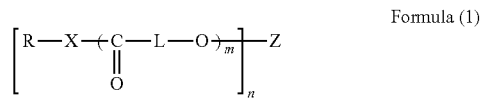

Formula (1)

wherein, in Formula (1), X denotes —O—, —S—, or $NR^1$—; each of R and $R^1$ independently denotes a hydrogen atom or a monovalent substituent; L denotes a divalent connecting group; Z denotes a partial structure of valence n comprising at least one group selected from the group consisting of carboxyl groups and carboxylate groups; m denotes an integer of greater than or equal to 2, and n denotes an integer of greater than or equal to 1.

17 Claims, No Drawings

MAGNETIC RECORDING MEDIUM AND COATING COMPOSITION FOR MAGNETIC RECORDING MEDIUM

CROSS-REFERENCE TO RELATED APPLICATIONS

This application claims priority under 35 U.S.C 119 to Japanese Patent Application No. 2014-202548 filed on Sep. 30, 2014 and Japanese Patent Application No. 2015-191529 filed on Sep. 29, 2015. Each of the above applications is hereby expressly incorporated by reference, in its entirety.

BACKGROUND OF THE INVENTION

Field of the Invention

The present invention relates to a magnetic recording medium and a coating composition for a magnetic recording medium.

Discussion of the Background

Particulate magnetic recording media (also referred to simply as "magnetic recording media", hereinafter) are normally manufactured by coating a coating composition containing binder and ferromagnetic powder on a nonmagnetic support, either directly or indirectly over at least one layer such as a nonmagnetic layer, and conducting a curing treatment such as heating or irradiation with light as needed to form a magnetic layer.

Conventionally, in particulate magnetic recording media, the binder has played an important role in enhancing dispersion of the ferromagnetic powder, increasing the durability of the magnetic layer, and the like. Various research has been conducted on binders (for example, see Japanese Unexamined Patent Publication (KOKAI) No. 2004-67941, which is expressly incorporated herein by reference in its entirety).

SUMMARY OF THE INVENTION

As described in Japanese Unexamined Patent Publication (KOKAI) No. 2004-67941, polar groups such as sulfonate groups have been incorporated into the binder to enhance dispersion of the ferromagnetic powder. The polar groups can be introduced into the binder to increase dispersion by causing the binder to efficiently adsorb to the surface of the ferromagnetic powder. However, as described in paragraph 0026 of Japanese Unexamined Patent Publication (KOKAI) No. 2004-67941, the introduction of an excessive quantity of polar groups tends to cause the dispersion of ferromagnetic powder to decrease. Accordingly, it has become difficult to adequately enhance dispersion of the ferromagnetic powder by introducing polar groups into the binder.

The use of resin with good mechanical properties as binder in the magnetic layer has been previously examined as a way of enhancing the durability of the magnetic layer. In this regard, Japanese Unexamined Patent Publication (KOKAI) No. 2004-67941 proposes using a prescribed copolymerization component such as an aromatic polyisocyanate to increase the concentration of urethane groups and thus enhance the mechanical properties of polyurethane resin employed as binder in the magnetic layer. However, as described in paragraph 0025 in Japanese Unexamined Patent Publication (KOKAI) No. 2004-67941, the higher the urethane group concentration of the resin employed as binder, the greater the drop in the solubility, despite enhancement of the mechanical properties of the resin. As a result, dispersion of the ferromagnetic powder tends to decrease. Thus, paragraph 0025 of Japanese Unexamined Patent Publication (KOKAI) No. 2004-67941 states that the concentration of urethane groups needs to be kept within a range within which good dispersion of the ferromagnetic powder can be maintained.

Additionally, even greater durability has come to be demanded of the magnetic layer in recent years. Reasons for this have included heightened market performance requirements and a reduction in the particle size of the ferromagnetic powder. Examples of the heightened market performance requirements of recent years are greater durability permitting continuous running for longer periods and with greater reliability than in the past. Since the magnetic force per bit has decreased with the reduction in particle size of the ferromagnetic powder, the reproduction head has tended to come closer to the surface of the magnetic recording medium (magnetic layer) in order to read information from such bits. As a result, the frequency of contact between the reproduction head and the surface of the magnetic recording medium (magnetic layer) has increased in recent years. Accordingly, magnetic recording media have been used in states in which the surface of the magnetic layer has been more prone to being scratched than in the past. To enhance the durability of the magnetic layer, it is conceivable to enhance the mechanical properties of the resin employed as binder in the magnetic layer, as has been previously investigated. However, as set forth above, the more the mechanical properties of the binder are enhanced to improve the durability of the magnetic layer, the more dispersion of the ferromagnetic powder tends to drop. Thus, achieving the further enhanced durability of the magnetic layer that has been demanded in recent years while also achieving better dispersion of the ferromagnetic powder is difficult by means of the binder, as was the practice in the past.

An aspect of the present invention provides for a new means of achieving enhanced durability of the magnetic layer along with enhanced dispersion of the ferromagnetic powder in a magnetic recording medium.

The present inventors conducted extensive research. As a result, they discovered that by using the compound denoted by Formula (1) below as a component of the magnetic layer along with ferromagnetic powder and binder, it was possible to achieve both enhanced durability of the magnetic layer and enhanced dispersion of ferromagnetic powder.

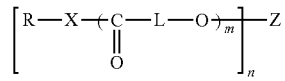

Formula (1)

(In Formula (1), X denotes —O—, —S—, or $NR^1$—; each of R and $R^1$ independently denotes a hydrogen atom or a monovalent substituent; and L denotes a divalent connecting group. Z denotes a partial structure of valence n comprising at least one group (also referred to as a "carboxyl (salt) group, hereinafter) selected from the group consisting of carboxyl groups and carboxylate groups; m denotes an integer of greater than or equal to 2, and n denotes an integer of greater than or equal to 1.)

Although not intended to limit the present invention in any way, presumptions of the present inventors are given below. The reasons for which the present inventors assume that both durability and dispersion can be achieved by the above compound are as set forth below.

The compound denoted by Formula (1) comprises a structure denoted by —((C=O)-L-O)m (i.e., polyester chain). The present inventors assume that this structure can contribute to imparting a suitable tendency to elongate to the magnetic layer (coating). More particularly, simply imparting a high degree of strength to the magnetic layer is thought to cause the magnetic layer to become brittle and tend to fracture. However, the present inventors presume that the above compound can impart a suitable degree of elongation to the magnetic layer, contributing to enhancing the durability of the magnetic layer.

As regards enhancing dispersion, the carboxyl (salt) groups contained in the Z moiety can adhere to the surface of particles of ferromagnetic powder, efficiently adsorbing the compound denoted by Formula (1) to the ferromagnetic powder. Thus, the above polyester chain can impart a steric hindrance effect, preventing particles of ferromagnetic powder from aggregating. This is thought to be why the above compound can enhance dispersion of the ferromagnetic powder. An aspect of the present invention was devised based on the above discoveries.

An aspect of the present invention relates to a magnetic recording medium, comprising a magnetic layer comprising ferromagnetic powder and binder on a nonmagnetic support, further comprising the compound denoted by Formula (1) above in the magnetic layer.

A further aspect of the present invention relates to a coating composition for a magnetic recording medium, comprising:
the compound denoted by Formula (1) above;
ferromagnetic powder;
binder; and
solvent.

In one embodiment, in Formula (1), L denotes an alkylene group.

In one embodiment, in Formula (1), X denotes —O—.

In one embodiment, in Formula (1), Z denotes a reactive residue of carboxylic acid anhydride. The term "carboxylic acid anhydride" refers to a compound comprising the partial structure denoted by —(C=O)—O—(C=O)—. In the carboxylic acid anhydride, this partial structure is a reactive moiety. The oxygen atoms of —((C=O)-L-O)m- and Z in Formula (1) are bonded through a carbonyl bond (—(C=O)—), and a carboxyl (salt) group is provided. The partial structure thus produced is a reactive residue of carboxylic acid anhydride. In one embodiment, the carboxylic acid anhydride is tetracarboxylic acid anhydride. The details are given further below.

In one embodiment, the weight average molecular weight of the compound denoted by Formula (1) falls within a range of greater than equal to 1,000 but less than 20,000.

In one embodiment, the average particle size of the ferromagnetic powder ranges from 10 nm to 50 nm.

In one embodiment, the compound denoted by Formula (1) is contained in a content ranging from 0.5 weight part to 50.0 weight parts per 100.0 weight parts of ferromagnetic powder in the above magnetic layer or coating composition for a magnetic recording medium.

An aspect of the present invention makes it possible to achieve both improved dispersion of the ferromagnetic powder and enhanced durability of the magnetic layer.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

The magnetic recording medium according to one aspect of the present invention comprises a magnetic layer containing ferromagnetic powder and binder on a nonmagnetic support and further comprises the compound denoted by Formula (1) in the magnetic layer.

The compound that is contained in the magnetic layer of the above magnetic recording medium can contribute to enhancing dispersion of the ferromagnetic powder. The magnetic layer that contains this compound can exhibit good durability (more specifically, good resistance to scratching).

The coating composition for a magnetic recording medium according to one aspect of the present invention comprises the compound denoted by Formula (1), ferromagnetic powder, binder, and solvent.

The above coating composition for a magnetic recording medium can be used as a coating liquid for forming a magnetic layer to form the magnetic layer of a magnetic recording medium according to one aspect of the present invention, or to prepare a coating liquid for forming a magnetic layer.

The above magnetic recording medium and coating composition for a magnetic recording medium (also referred to as the "composition", hereinafter) will be described in greater detail below.

In the present invention, unless specifically stated otherwise, all groups that are referred to can be substituted or unsubstituted. When a given group comprises one or more substituents, examples of the substituent are an alkyl group (such as an alkyl group with 1 to 6 carbon atoms), a hydroxyl group, an alkoxy group (such as an alkoxy group with 1 to 6 carbon atoms), a halogen atom (such as a fluorine, chlorine, or bromine atom), a cyano group, an amino group, a nitro group, an acyl group, or a carboxyl (salt) group. When referring to a group comprising a substituent, the "number of carbon atoms" means the number of carbon atoms of the portion excluding the substituent.

<Compound Denoted by Formula (1)>
(Details Regarding Formula (1))
Formula (1) is as follows.

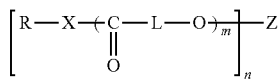

Formula (1)

(In Formula (1), X denotes —O—, —S—, or $NR^1$—; each of R and $R^1$ independently denotes a hydrogen atom or a monovalent substituent; and L denotes a divalent connecting group. Z denotes a partial structure of valence n comprising at least one group (carboxyl (salt) group) selected from the group consisting of carboxyl groups and carboxylate groups; m denotes an integer of greater than or equal to 2, and n denotes an integer of greater than or equal to 1.)

In Formula (1), there are m×n instances of L. There are also n instances of each of R and X. When L is present in a plurality of number in Formula (1), the plurality of L can be identical or different. The same applies to R and X.

In Formula (1), X denotes —O—, —S—, or $NR^1$— and $R^1$ denotes a hydrogen atom or a monovalent substituent. Examples of the monovalent substituents are the above substituents. An alkyl group is desirable, an alkyl group with 1 to 6 carbon atoms is preferred, and a methyl or an ethyl group is of greater preference. Even more preferably, $R^1$ denotes a hydrogen atom. X desirably denotes —O—.

R denotes a hydrogen atom or a monovalent substituent. R desirably denotes a monovalent substituent. Examples of monovalent substituents denoted by R are linear and branched alkyl groups, aryl groups, heteroaryl groups, alicyclic groups, and non-aromatic heterocyclic groups, as well as structures in which a divalent connecting group is linked to these monovalent groups. Examples of the divalent connecting group are divalent connecting groups comprised of one, or a combination of two or more, members selected from the group consisting of —C(=O)—O—, —O—, —C(=O)—$NR^{10}$— (where $R^{10}$ denotes a hydrogen atom or an alkyl group having 1 to 4 carbon atoms), —O—C(=O)—NH—, phenylene groups, alkylene groups having 1 to 30 carbon atoms, and alkenylene groups having 2 to 30 carbon atoms. The following structures are specific examples of monovalent substituents denoted by R. In the following structures, "*" denotes the position of the bond with X. However, the present invention is not limited to the specific examples given below.

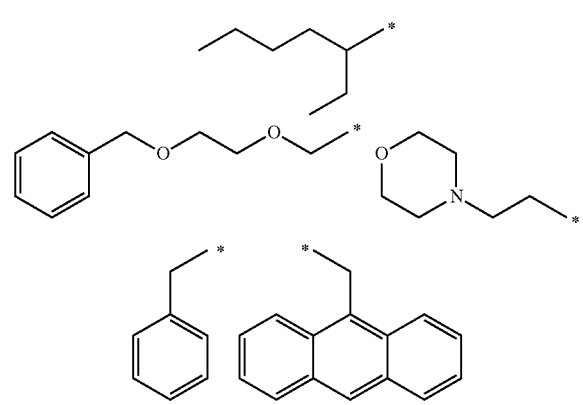

-continued

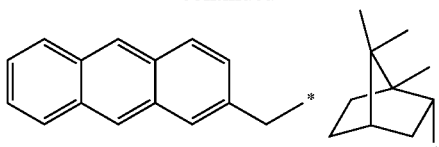

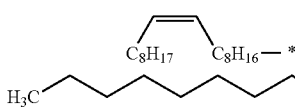

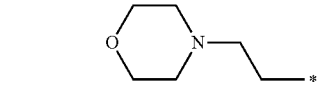

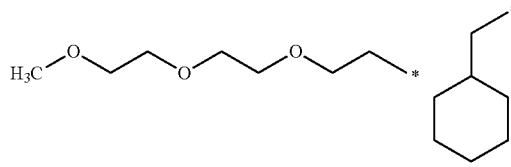

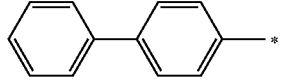

In Formula (1), L denotes a divalent connecting group. Examples of divalent connecting groups are divalent connecting groups comprised of one, or a combination of two or more, members selected from the group consisting of linear, branched, and cyclic alkylene groups; linear, branched, and cyclic alkenylene groups; —C(=O)—; —O—; arylene groups; and halogen atoms. More specific examples are divalent connecting groups comprised of one, or a combination of two or more, members selected from the among linear, branched, and cyclic alkylene groups with 1 to 12 carbon atoms; linear, branched, and cyclic alkenylene groups having 1 to 6 carbon atoms; —C(=O)—, —O—, phenylene groups, and halogen atoms. The above divalent connecting group desirably comprises 1 to 10 carbon atoms, 0 to 10 oxygen atoms, 0 to 10 halogen atoms, and 1 to 30 hydrogen atoms. Specific examples are alkylene groups and the structures given below. In the structures given below, "*" denotes the position of a bond with another structure. However, the present invention is not limited to the following specific examples.

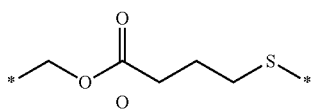

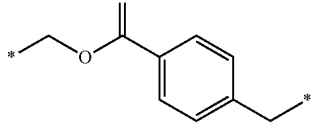

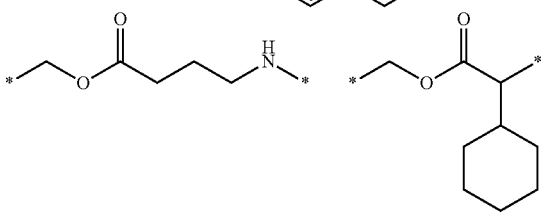

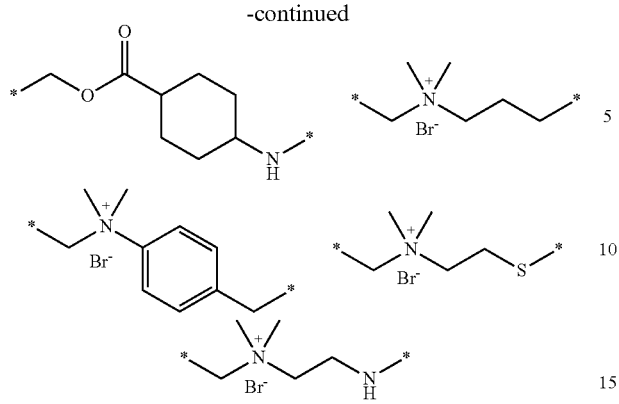

L desirably denotes an alkylene group, preferably denotes an alkylene group with 1 to 12 carbon atoms, more preferably denotes an alkylene group with 1 to 5 carbon atoms, and still more preferably, denotes an unsubstituted alkylene group with 1 to 5 carbon atoms.

Z denotes a partial structure of valence n comprising at least one group (carboxyl (salt) group) selected from the group consisting of carboxyl groups and carboxyl salt groups. The term "carboxyl salt group" means the salt form of a carboxyl group (—COOH). In —COOM, M denotes a cation such as an alkali metal ion.

At least one, desirably 2 or more, and preferably, 2 to 4, carboxyl (salt) groups are contained per instance of Z.

Z can contain one or more linear, branched, or cyclic structures. From the perspective of ease of synthesis, Z is desirably a reactive residue of a carboxylic acid anhydride. Specific examples are the following structures. In the following structures, "a" denotes the site of a bond with another structure. However, the present invention is not limited to the following specific examples.

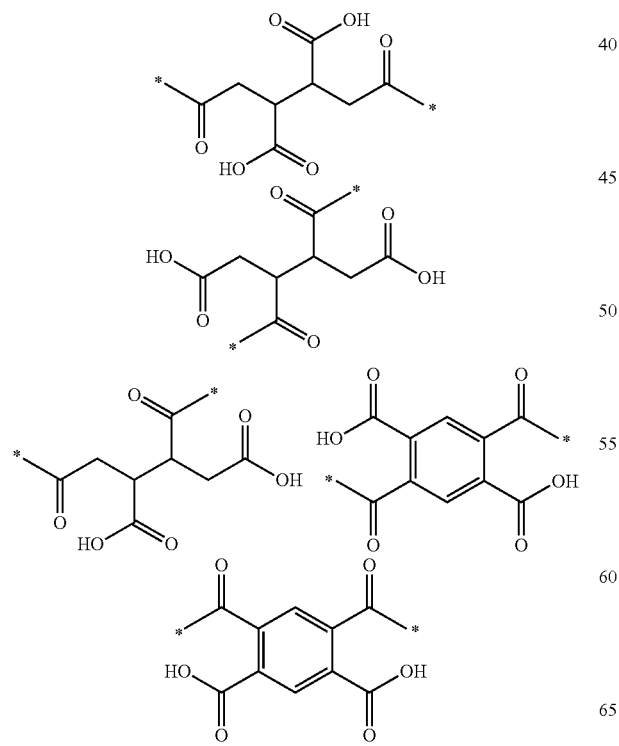

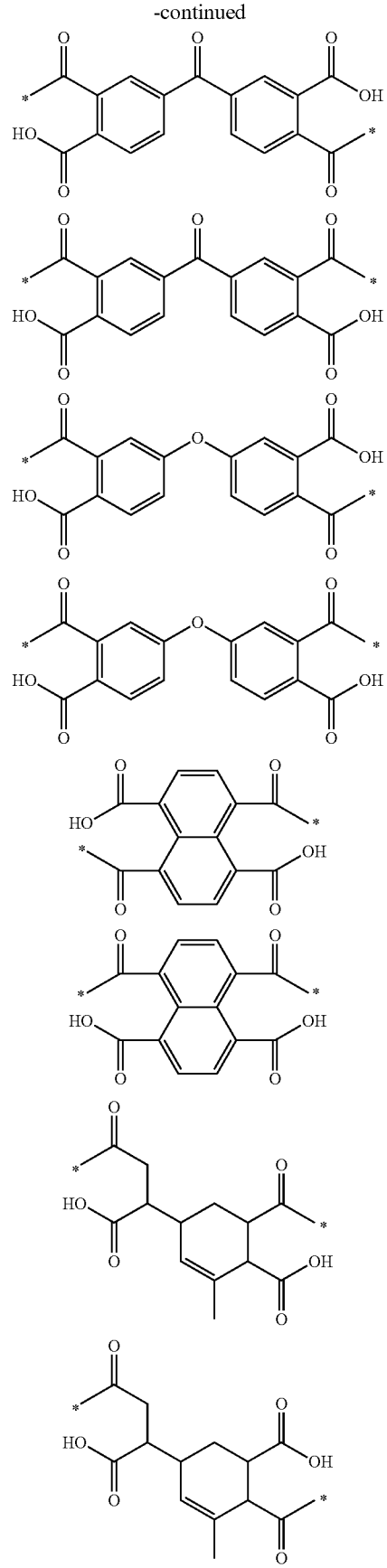

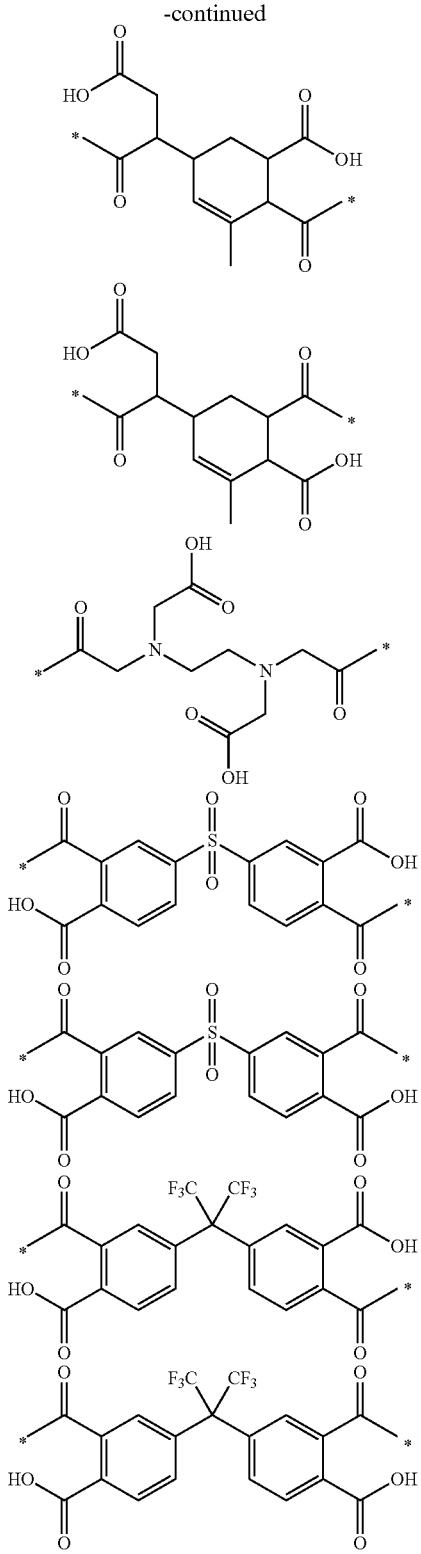

Synthesizing the compound denoted by Formula (1) using a carboxylic acid anhydride having at least one of the above-described —(C═O)—O—(C═O)— partial structures makes it possible to obtain a compound denoted by Formula (1) having the reactive residue in the form of a monovalent reactive residue. Using a compound having two such partial structures makes it possible to obtain a compound denoted by Formula (1) having the reactive residue in the form of a divalent reactive residue. The same applies to a compound denoted by Formula (1) having a trivalent or higher reactive residue. As set forth above, n denotes an integer that is greater than or equal to 1; for example, an integer falling within a range of 1 to 4, desirably an integer falling within a range of 2 to 4.

By way of example, employing a tetracarboxylic acid anhydride as the carboxylic acid anhydride makes it possible to obtain a compound denoted by Formula (1) in which n=2. The term "tetracarboxylic acid anhydride" refers to a compound having four carboxyl groups per molecule in which two of the above partial structures are imparted to each molecule by the dehydration condensation of pairs of carboxyl groups. In Formula (1), a compound in which Z denotes the reactive residue of a tetracarboxylic acid anhydride is desirable from the perspective of further enhancing the durability of the magnetic layer and the dispersion of the ferromagnetic powder. Examples of tetracarboxylic acid anhydrides are various tetracarboxylic acid anhydrides such as aliphatic tetracarboxylic acid anhydrides, aromatic tetracarboxylic acid anhydrides, and polycyclic tetracarboxylic acid anhydrides.

Examples of aliphatic tetracarboxylic acid anhydrides are meso-butane-1,2,3,4-tetracarboxylic acid dianhydride, 1,2,3,4-cyclobutane tetracarboxylic acid dianhydride, 1,3-dimethyl-1,2,3,4-cyclobutane tetracarboxylic acid dianhydride, 1,2,3,4-cyclopentane tetracarboxylic acid dianhydride, 2,3,5-tricarboxycyclopentylacetic acid dianhydride, 2,3,5,6-tetracarboxycyclohexane dianhydride, 2,3,5,6-tetracarboxynorbomane dianhydride, 3,5,6-tricarboxynobomane-2-acetic acid dianhydride, 2,3,4,5-tetrahydrofurantetracarboxylic acid dianhydride, 5-(2,5-dioxotetrahydrofuryl)-3-methyl-3-cyclohexene-1,2-dicarboxylic acid dianhydride, bicyclo[2,2,2]-octo-7-ene-2,3,5,6-tetracarboxylic acid dianhydride, and ethylene diamine tetraacetic acid dianhydride.

Examples of aromatic tetracarboxylic acid anhydrides are pyromellitic acid dianhydride, ethylene glycol dianhydrous trimellitic acid ester, propylene glycol dianhydrous trimellitic acid ester, butylene glycol dianhydrous trimellitic acid ester, 3,3',4,4'-benzophenonetetracarboxlic acid dianhydride, 2,2',3,3'-benzophenonetetracarboxylic acid dianhydride, 3,3',4,4'-biphenylsulfonetetracarboxylic acid dianhydride, 2,2',3,3'-biphenylsulfonetetracarboxylic acid dianhydride, 1,4,5,8-naphthalenetetracarboxylic acid dianhydride, 2,3,6,7-naphthalenetetracarboxylic acid dianhydride, 3,3',4,4'-biphenylethertetracarboxylic acid dianhydride, 3,3',4,4'-dimethyldiphenylsilane tetracarboxylic acid dianhydride, 3,3',4,4'-tetraphenylsilane tetracarboxylic acid dianhydride, 1,2,3,4-furanetetracarboxylic acid dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropylidenediphthalic acid dianhydride, 3,3',4,4'-biphenyltetracarboxylic acid dianhydride, bis(phthalic acid)phenylphosphineoxide dianhydride, p-phenylene-bis(triphenylphthalic acid)dianhydride, M-phenylene-bis(triphenylphthalic acid)dianhydride, bis(triphenylphthalic acid)-4,4'-diphenyl ether dianhydride, bis(triphenylphthalic acid)-4,4'-diphenylmethane dianhydride, 9,9-bis(3,4-dicarboxyphenyl)fluorene dianhydride, and 9,9-bis[4-(3,4-dicarboxyphenoxy)phenyl]fluorene dianhydride.

Examples of polycyclic tetracarboxylic acid anhydrides are 3,4-dicarboxy-1,2,3,4-tetrahydro-1-naphthalenesuccinic acid dianhydride and 3,4-dicarboxy-1,2,3,4-tetrahydro-6-methyl-1-naphthalenesuccinic acid dianhydride.

In Formula (1), m denotes an integer greater than or equal to 2. As set forth above, in the compound denoted by Formula (1), the structure (polyester chain) denoted by —((C=O)-L-O)m- is thought to contribute to enhancing dispersion and durability. From these perspectives, m desirably denotes an integer falling within a range of 5 to 200, preferably an integer falling within a range of 5 to 100, and more preferably, an integer falling within a range of 5 to 60.

(Weight Average Molecular Weight)

It suffices for the compound denoted by Formula (1) to have the structure set forth above; the molecular weight is not limited. The weight average molecular weight of the compound denoted by Formula (1) is desirably greater than or equal to 1,000 but less than 20,000. This weight average molecular weight can be generally lower than the molecular weight of the binder that is employed in the magnetic layer. The compound having such a weight average molecular weight is thought to contribute to enhancing the durability of the magnetic layer by acting as a plasticizer. From this perspective, the weight average molecular weight of the compound denoted by Formula (1) is preferably less than or equal to 12,000, and more preferably, less than or equal to 10,000. For the compound denoted by Formula (1), it is, for example, greater than or equal to 1,000, preferably greater than or equal to 1,500, and more preferably, greater than or equal to 2,000. In the present invention, the term "weight average molecular weight" refers to a value that is obtained by measurement by gel permeation chromatography (GPC) and conversion to a standard polystyrene conversion. The weight average molecular weights given in Examples described further below are values obtained by making GPC measurements under the following measurement conditions and converting the values obtained to standard polystyrene conversion. For a mixture of two or more structural isomers, it refers to the weight average molecular weight of the two or more structural isomers contained in the mixture.

GPC device: HLC-8220 (made by Tosoh)
Guard column: TSK guard column Super HZM-H
Column: TSKgel Super HZ 2000, TSKgel Super HZ 4000, TSKgel Super HZ-M (made by Tosoh, 4.6 mm (inner diameter)×15.0 cm, three columns connected in series)
Eluent: Tetrahydrofuran (THF), containing stabilizer (2,6-di-t-butyl-4-methylphenol)
Eluent flow rate: 0.35 mL/minute
Column temperature: 40° C.
Inlet temperature: 40° C.
Refractive index (RI) measurement temperature: 40° C.
Sample concentration: 0.3 weight %
Quantity of sample injected: 10 μL The various compounds indicated in Examples further below are specific examples of the above compound.

(Synthesis Method)

The compound denoted by Formula (1) that has been described above can be synthesized by known methods. An example of a synthesis method is a method where a carboxylic acid anhydride and the compound denoted by Formula (2) below are subjected to a ring-opening addition reaction or the like. In Formula (2), each of R, X, L, and m are defined as in Formula (1). A denotes a hydrogen atom, alkali metal atom, or quaternary ammonium base, desirably a hydrogen atom.

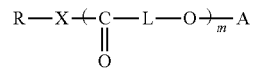

Formula (2)

In the reaction of carboxylic acid anhydride and the compound denoted by Formula (2), when conducted with butane tetracarboxylic acid anhydride, the butane tetracarboxylic acid anhydride is mixed in a proportion of 0.4 mol to 0.5 mol per equivalent of hydroxyl groups. The reaction is conducted for about 3 hours to 12 hours with heating and stirring without solvent, or with an organic solvent with a boiling point of 50° C. or higher as needed, and in the presence of a reaction catalyst such as a tertiary amine or inorganic base. Even when employing some other carboxylic acid anhydride, the reaction between the carboxylic acid anhydride and the compound denoted by Formula (2) can be implemented according to the above reaction conditions or according to known reaction conditions.

Subsequent steps such as purification can be implemented as needed following the above reaction.

The compound denoted by Formula (2) that is employed can be a commercial product or can be obtained by a known polyester synthesis method. An example of a polyester synthesis method is lactone ring-opening polymerization. Examples of the lactone are ε-caprolactone, δ-caprolactone, β-propiolactone, γ-butyrolactone, δ-valerolactone, γ-valerolactone, enantolactone, β-butyrolactone, γ-hexanolactone, γ-octanolactone, δ-hexanolactone, δ-octanolactone, δ-dodecanolactone, α-butyl-γ-butyolactone, and lactides. The lactide can be L-form or D-form. In polyester synthesis, one type of lactone can be employed, or two or more lactones of differing structures can be employed. ε-caprolactone, lactides, and δ-valerolactone are desirable as lactones from the perspective of their reaction properties and availability. However, there is no limitation thereto. Any lactone that can yield a polyester by means of ring-opening polymerization will do.

An alcohol, thiol, amine, or the like can be employed as a nucleophilic reagent in the ring-opening polymerization of a lactone. One nucleophilic reagent can be employed, or a mixture of two or more can be employed.

For example, when employing an alcohol and denoting the alcohol as $R^2OH$, the $R^2$ moiety can be present as the RX-moiety in the structure denoted by Formula (1). Here, X denotes —O—.

When employing a thiol and denoting the thiol as $R^2SH$, the $R^2S$ moiety can be present as the RX-moiety in the structure denoted by Formula (1). Here, X denotes —S—.

When employing an amine and denoting the amine as $RR^1NH$, the $RR^1N$-moiety can be present as the RX-moiety in the structure denoted by Formula (1). Here, X denotes —$NR^1$—. Each of R and $R^1$ is as defined in Formula (1).

However, the compound denoted by Formula (2) is not limited to structures derived from polyesters obtained by the ring-opening polymerization of lactones. It can also be a structure derived from polyester obtained by a known polyester synthesis method such as the polycondensation of a polyvalent carboxylic acid and a polyvalent alcohol or the polycondensation of hydroxycarboxylic acids.

The above synthesis method is but an example and does not limit the present invention in any way. Any known synthesis method can be employed without limitation so long as it permits the synthesis of the compound denoted by Formula (1). Following synthesis, the reaction product can be employed as is, or subjected to purification by a known method as needed and then used, to form the magnetic layer.

The compound denoted by Formula (1) set forth above is contained along with ferromagnetic powder and binder in the magnetic layer of the above magnetic recording medium. In a composition according to an aspect of the present invention, it is contained along with ferromagnetic powder, binder, and solvent. Just one such compound can be employed, or two or more such compounds having different structures can be employed in combination. Further, the compound denoted by Formula (1) can be employed in the form of a mixture of two or more structural isomers. For example, when two or more structural isomers are obtained by a synthesis reaction of the compound denoted by Formula (1), the mixture can be used to prepare the composition according to an aspect of the present invention. When employing two or more such compounds in combination, the content given below refers to the combined content of the compounds employed in combination. The same applies to the contents of the various components given further below. The content of the compound denoted by Formula (1) is desirably greater than or equal to 0.5 weight part, and preferably greater than or equal to 1.0 weight part, per 100.0 weight parts of ferromagnetic powder from the perspective of enhancing dispersion of the ferromagnetic powder and the durability of the magnetic layer. It is also desirable to raise the fill rate of the ferromagnetic powder in the magnetic layer to increase the recording density. Because of this, it is desirable to reduce the relative content of components other than ferromagnetic powder. From the above perspectives, the content of the above compound is desirably less than or equal to 50.0 weight parts, preferably less than or equal to 40 weight parts, and more preferably, less than or equal to 30.0 weight parts, per 100.0 weight parts of ferromagnetic powder.

<Binder>

Various binders that are commonly employed as binders in particulate magnetic recording media can be employed without limitation as the binder contained in the composition and in the magnetic recording medium according to an aspect of the present invention. The binder employed can be in the form of polyurethane resin, polyester resin, polyamide resin, vinyl chloride resin, styrene, acrylonitrile, methyl methacrylate, and other copolymerized acrylic resins; nitrocellulose and other cellulose resins; epoxy resin; phenoxy resin; polyvinyl acetal, polyvinyl butyral, and other polyvinyl alkyrals; these resins can be employed singly or two or more resins can be mixed for use. Of these, polyurethane resins, acrylic resins, cellulose resins, and vinyl chloride resins are desirable, and polyurethane resins and vinyl chloride resins are preferable. These resins can also be employed as binders in the nonmagnetic layer, described further below. Reference can be made to Japanese Unexamined Patent Publication (KOKAI) No. 2010-24113, which is expressly incorporated herein by reference in its entirety, paragraphs 0028 to 0031, with regard to the binders. The content of binder, for example, falls within a range of 5.0 to 50.0 weight parts, desirably within a range of 10.0 to 30.0 weight parts, per 100 weight parts of ferromagnetic powder.

As stated above, the compound denoted by Formula (1) is desirably a compound with a molecular weight that is lower than that of the resins that are commonly employed as binders. The fact that such compounds can have the effects of plasticizers on the binder is presumed by the present inventors to contribute to further enhancing the durability of the magnetic layer. The weight average molecular weight of the binder desirably falls within a range of 20,000 to 120,000, preferably within a range of 30,000 to 100,000, and more preferably, within a range of 30,000 to 60,000.

<Ferromagnetic Powder>

The average particle size of the ferromagnetic powder is desirably less than or equal to 50 nm. Ferromagnetic powder with an average particle size of less than or equal to 50 nm is able to achieve the high-density recording that has been demanded in recent years. However, it is difficult to achieve a high degree of dispersion. By contrast, use in combination with the compound denoted by Formula (1) makes it possible to enhance the dispersion of ferromagnetic powder having an average particle size of less than or equal to 50 nm. From the perspective of the stability of magnetization, the average particle size is desirably greater than or equal to 10 nm, preferably greater than or equal to 20 nm.

The average particle size of the ferromagnetic powder is a value that is measured by the following method with a transmission electron microscope.

Ferromagnetic powder is photographed at a magnification of 100,000-fold with a transmission electron microscope, and the photograph is printed on print paper at a total magnification of 500,000-fold to obtain a photograph of the particles constituting the ferromagnetic powder. A target particle is selected from the photograph of particles that has been obtained, the contour of the particle is traced with a digitizer, and the size of the (primary) particle is measured. The term "primary particle" refers to an unaggregated, independent particle. The above measurement is conducted on 500 randomly extracted particles. The arithmetic average of the particle size of the 500 particles obtained in this manner is adopted as the average particle size of the ferromagnetic powder. A Model H-9000 transmission electron microscope made by Hitachi can be employed as the above transmission electron microscope, for example. The particle size can be measured with known image analysis software, such as KS-400 image analysis software from Carl Zeiss.

In the present invention, the average particle size of the powder is the average particle size as obtained by the above method. The average particle size indicated in Examples further below was obtained using a Model H-9000 transmission electron microscope made by Hitachi and KS-400 image analysis software made by Carl Zeiss.

The method described in paragraph 0015 of Japanese Unexamined Patent Publication (KOKAI) No. 2011-048878, which is expressly incorporated herein by reference in its entirety, for example, can be employed as the method of collecting sample powder such as ferromagnetic powder from a magnetic layer for particle size measurement.

In the present invention, the size of the particles constituting powder such as ferromagnetic powder (referred to as the "particle size", hereinafter) is denoted as follows based on the shape of the particles observed in the above particle photograph:

(1) When acicular, spindle-shaped, or columnar (with the height being greater than the maximum diameter of the bottom surface) in shape, the particle size is denoted as the length of the major axis constituting the particle, that is, the major axis length.

(2) When platelike or columnar (with the thickness or height being smaller than the maximum diameter of the plate surface or bottom surface) in shape, the particle size is denoted as the maximum diameter of the plate surface or bottom surface.

(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of a powder refers to the arithmetic average of values obtained for the above 500 particles by measuring the length of the minor axis, that is the minor axis length, of the particles measured above, and calculating the value of the (major axis length/minor axis length) of each particle. The term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

When the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

Hexagonal ferrite powder is a specific example of desirable ferromagnetic powder. From the perspectives of achieving higher density recording and magnetization stability, the average particle size (average plate diameter) of hexagonal ferrite powder desirably ranges from 10 nm to 50 nm, preferably 20 nm to 50 nm. Reference can be made to Japanese Unexamined Patent Publication (KOKAI) No. 2011-216149, paragraphs 0134 to 0136, for details on hexagonal ferrite powder. The content of the above publication is expressly incorporated herein by reference in its entirety.

Ferromagnetic metal powder is also a specific example of desirable ferromagnetic powder. From the perspectives of achieving higher density recording and magnetization stability, the average particle size (average major axis length) of ferromagnetic metal powder desirably ranges from 10 nm to 50 nm, preferably 20 nm to 50 nm. Reference can be made to Japanese Unexamined Patent Publication (KOKAI) No. 2011-216149, paragraphs 0137 to 0141, for details on ferromagnetic metal powder.

The content (fill rate) of the ferromagnetic powder in the magnetic layer desirably falls within a range of 50 to 90 weight %, preferably within a range of 60 to 90 weight %. It is desirable for the fill rate to be high from the perspective of increased recording density.

<Solvent>

The composition according to an aspect of the present invention contains the compound denoted by Formula (1), the ferromagnetic powder, and the binder set forth above in a solvent. Examples of the solvent are the organic solvents commonly employed to manufacture particulate magnetic recording media. Specific examples are: acetone, methyl ethyl ketone, methyl isobutyl ketone, diisobutyl ketone, cyclohexanone, isophorone, tetrahydrofuran, and other ketones; methanol, ethanol, propanol, butanol, isobutyl alcohol, isopropyl alcohol, methylcyclohexanol, and other alcohols; methyl acetate, butyl acetate, isobutyl acetate, isopropyl acetate, ethyl lactate, glycol acetate, and other esters; glycol dimethyl ether, glycol monoethyl ether, dioxane, and other glycol ethers; benzene, toluene, xylene, cresol, clorobenzene, and other aromatic hydrocarbons; methylene chloride, ethylene chloride, carbon tetrachloride, chloroform, ethylene chlorohydrin, dichlorobenzene, and other chlorinated hydrocarbons; N,N-dimethylformamide; and hexane. They can be employed in any ratio. Of these, the use of organic solvents containing ketones (ketone organic solvents) is desirable from the perspectives of the solubility of the binders that are commonly employed in magnetic recording media and adsorption of the binder to the surface of the particles of ferromagnetic powder.

The above organic solvent does not have to be 100 percent pure, and may contain impurities, such as foreign matter, unreacted material, byproducts, decomposition products, oxides, and moisture, in addition to the primary component. These impurities desirably constitute equal to or less than 30 weight %, preferably equal to or less than 10 weight %. Somewhat strong polarity is desirable for enhancing dispersion; it is desirable for the solvent composition to comprise equal to or greater than 50 weight % of a solvent with a dielectric constant of equal to or greater than 15. A dissolution parameter of 8 to 11 is desirable. The quantity of solvent in the coating composition of an aspect of the present invention is not specifically limited, and can be set to the range as in a common coating liquid for forming a magnetic layer in a particulate magnetic recording medium.

<Other Components>

In addition to the various components set forth above, additives can be added as needed to the composition according to an aspect of the present invention. Examples of additives are the various additives commonly employed to form particulate magnetic recording media, such as abrasives, lubricants, dispersing agents, dispersing adjuvants, antifungal agents, antistatic agents, oxidation inhibitors, and carbon black. The additives can be suitably selected for use from among commercial products based on desired properties. In the composition according to an aspect of the present invention, the compound denoted by Formula (1) can function as a dispersing agent.

The above composition can contain a known curing agent. A magnetic layer formed using a coating liquid for forming a magnetic layer containing a curing agent will normally contain a reaction product in which the binder and curing agent are crosslinked. The use of a curing agent is desirable to increase the strength of the magnetic layer. Polyisocyanate is desirably employed as a curing agent from the perspective of crosslinking reactivity and the like. Reference can be made to Japanese Unexamined Patent Publication (KOKAI) No. 2011-216149, paragraphs 0124 and 0125 for details relating to polyisocyanate. The curing agent is employed, for example, in a proportion of 0 to 80.0 weight parts, and from the perspective of increasing the strength of the magnetic layer, the curing agent is desirably added in a quantity of 50.0 to 80.0 weight parts, per 100.0 weight parts of binder in the coating liquid for forming the magnetic layer.

The above composition can be prepared by simultaneously mixing, or sequentially mixing in any order, the various compounds set forth above. The method of preparing the composition is not specifically limited. Known techniques of preparing coating liquids for forming the magnetic layers of particulate magnetic recording media can be applied without limitation.

<Configuration and Manufacturing Process of the Magnetic Recording Medium>

The configuration and manufacturing process of the above magnetic recording medium will be described in greater detail below.

(Magnetic Layer)

The magnetic layer can be formed by coating and drying a coating liquid for forming a magnetic layer on the surface of a nonmagnetic support, either directly or on the surface of another layer such as a nonmagnetic layer provided on the nonmagnetic support, and conducting a treatment such as heating as needed. The various components contained in the magnetic layer and the composition that can be used to form the magnetic layer are as set forth above.

(Nonmagnetic Layer)

Details of the nonmagnetic layer will be described next. In the magnetic recording medium of an aspect of the present invention, a nonmagnetic layer containing nonmagnetic powder and binder can be present between the nonmagnetic support and the magnetic layer. Either inorganic substances or organic substances can be employed as the nonmagnetic powder in the nonmagnetic layer. Carbon black can also be employed. Examples of inorganic substances are metals, metal oxides, metal carbonates, metal sulfates, metal nitrides, metal carbides, and metal sulfides. These nonmagnetic powders are available as commercial products and can be manufactured by known methods. Reference can be made to Japanese Unexamined Patent Publication (KOKAI) No. 2011-216149, paragraphs 0146 to 0150, for details in this regard.

The binders, lubricants, dispersing agents, additives, solvents, dispersion methods, and the like of the magnetic layer can be applied to the nonmagnetic layer. In particular, techniques that are known with regard to the magnetic layer can be applied to the quantity and type of binder and the quantities and types of additives and dispersing agents that are added. It is also possible to add carbon black and organic powders to the nonmagnetic layer. In that regard, reference can be made to Japanese Unexamined Patent Publication (KOKAI) No. 2010-24113, paragraphs 0040 to 0042, for example.

(Nonmagnetic Support)

Details of the nonmagnetic support will be described next. Examples of nonmagnetic supports are known supports such as biaxially stretched polyethylene terephthalate, polyethylene naphthalate, polyamide, polyamide-imide, and aromatic polyamide. Of these, polyethylene terephthalate, polyethylene naphthalate, and polyamide are desirable. These supports can be subjected to corona discharge, plasma treatment, adhesion-enhancing treatment, and heat treatment in advance.

(Layer Structure)

With regard to the thickness of the nonmagnetic support and each layer in the magnetic recording medium, the thickness of the nonmagnetic support desirably ranges from 3 μm to 80 μm. The thickness of the magnetic layer can be optimized for the magnetization saturation and head gap length of the magnetic head employed, the bandwidth of the recording signal, and the like, and is generally 10 nm to 150 nm, desirably 20 nm to 120 nm, preferably 30 nm to 100 nm. It suffices for the magnetic layer to be comprised of at least one layer, and it can be separated into two or more layers of differing magnetic characteristics. A structure relating to a known multilayer magnetic layer can be applied.

The thickness of the nonmagnetic layer is, for example, 0.1 μm to 3.0 μm, desirably 0.1 μm to 2.0 μm, and preferably 0.1 μm to 1.5 μm. The nonmagnetic layer in the present invention includes an essentially nonmagnetic layer containing trace quantities of ferromagnetic powder, for example, either as impurities or intentionally, in addition to the nonmagnetic powder. The essentially nonmagnetic layer means a layer exhibiting a residual magnetic flux density of equal to or less than 10 mT, a coercive force of equal to or less than 7.96 kA/m (100 Oe), or a residual magnetic flux density of equal to or less than 10 mT and a coercive force of equal to or less than 7.96 kA/m (100 Oe). The nonmagnetic layer desirably has no residual magnetic flux density or coercive force.

(Backcoat Layer)

In the magnetic recording medium, a backcoat layer can be provided on the opposite surface of the nonmagnetic support from the surface on which the magnetic layer is present. The backcoat layer desirably contains carbon black and inorganic powder. The formula of the magnetic layer or nonmagnetic layer can be applied to the binder and various additives for forming the backcoat layer. The backcoat layer is desirably equal to or less than 0.9 μm, preferably 0.1 to 0.7 μm in thickness.

(Manufacturing Steps)

The process of manufacturing coating liquids for forming the magnetic layer, nonmagnetic layer, and backcoat layer normally comprises at least a kneading step, dispersing step, and a mixing step, provided as needed before and/or after these steps. Each of these steps can be divided into two or more stages. All of the starting materials employed in an aspect of the present invention, such as the ferromagnetic powder, the compound denoted by Formula (1), nonmagnetic powder, binder, carbon black, abrasives, antistatic agents, lubricants, and solvents can be added either at the start of, or part way through, any step. Any of the starting materials can be divided up and added in two or more steps. For example, polyurethane can be divided up and added in the kneading step, dispersing step, and in a kneading step after the dispersing step for viscosity adjustment. To manufacture the magnetic recording medium of an aspect of the present invention, conventionally known manufacturing techniques can be employed. A device with powerful kneading strength such as an open kneader, continuous kneader, pressure kneader, extruder, or the like is desirably employed in the kneading step. These kneading treatments are described in Japanese Unexamined Patent Publication (KOKAI) Heisei Nos. 1-106338 and 1-79274, which are expressly incorporated herein by reference in their entirety. Glass beads or some other beads can be employed to disperse the magnetic layer coating liquid, nonmagnetic layer coating liquid, or backcoat layer coating liquid. Dispersion beads of high specific gravity in the form of zirconia beads, titanium beads, or steel balls are suitable as such dispersion beads. These dispersion beads can be employed by optimizing their particle diameters and fill rates. A known dispersing apparatus can be employed. Reference can be made to Japanese Unexamined Patent Publication (KOKAI) No. 2010-24113, paragraphs 0051 to 0057, for details on methods of manufacturing the magnetic recording medium.

Further, as described in Japanese Unexamined Patent Publication (KOKAI) No. 2012-74097, paragraph 0055, a heat treatment can be implemented separately from the drying step and calendering step as needed. The content of the above publication is expressly incorporated herein by reference in its entirety.

In the magnetic recording medium according to an aspect of the present invention set forth above, it is possible to achieve both enhanced dispersion of the ferromagnetic powder and improved running durability of the magnetic layer. A coating composition for a magnetic recording medium according to an aspect of the present invention can be suitably employed to form such a magnetic layer.

EXAMPLES

The present invention is described with greater specifically through Examples below. However, the present invention is not limited to the embodiments given in Examples. Unless specifically stated otherwise, the "parts" and "%" given below are based on weight.

The weight average molecular weights given below were obtained by GPC measurement under the conditions given above and conversion to polystyrene conversion.

The fact that the target compounds were obtained by the synthesis methods set forth below was confirmed by $^1$H-NMR (nuclear magnetic resonance), GPC, and acid value measurement. The acid value measurement was conducted according to JIS K 2501 (2003).

Precursor Synthesis Examples (Synthesis Example 1) Synthesis of Precursor 1

To a 500 mL three-necked flask were charged 197.2 g of s-caprolactone and 15.0 g of 2-ethyl-1-hexanol. These were stirred and dissolved while blowing in nitrogen. A 0.1 g quantity of monobutyltin oxide was added and the mixture was heated to 100° C. After 8 hours, the disappearance of the starting materials was confirmed by gas chromatography. The mixture was then cooled to room temperature, yielding 200 g of Precursor 1 (of the structure given below) in the form of a solid.

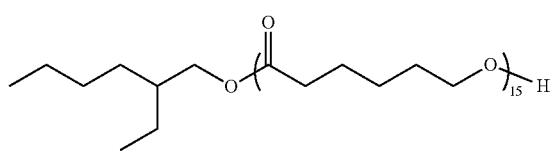

(Synthesis Example 2) Synthesis of Precursor 2

To a 500 mL three-necked flask were charged 197.2 g of s-caprolactone and 18.9 g of methyl triglycol. These were stirred and dissolved while blowing in nitrogen at 80° C. A 0.1 g quantity of monobutyltin oxide was added and the mixture was heated to 100° C. After 8 hours, the disappearance of the starting materials was confirmed by gas chromatography. The mixture was then cooled to room temperature, yielding 200 g of Precursor 2 (of the structure given below) in the form of a solid.

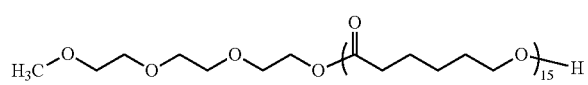

(Synthesis Example 3) Synthesis of Precursor 3

To a 500 mL three-necked flask were charged 197.2 g of 8-caprolactone and 12.5 g of benzyl alcohol. These were stirred and dissolved while blowing in nitrogen at 80° C. A 0.1 g quantity of monobutyltin oxide was added and the mixture was heated to 100° C. After 8 hours, the disappearance of the starting materials was confirmed by gas chromatography. The mixture was then cooled to room temperature, yielding 200 g of Precursor 3 (of the structure given below) in the form of a solid.

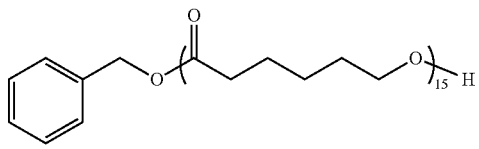

(Synthesis Example 4) Synthesis of Precursor 4

To a 500 mL three-necked flask were charged 197.2 g of ε-caprolactone and 27.2 g of diethylene glycol monobenzyl ether. These were stirred and dissolved while blowing in nitrogen. A 0.1 g quantity of monobutyltin oxide was added and the mixture was heated to 100° C. After 8 hours, the disappearance of the starting materials was confirmed by gas chromatography. The mixture was then cooled to room temperature, yielding 210 g of Precursor 4 (of the structure given below) in the form of a solid.

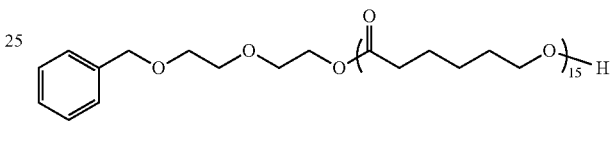

(Synthesis Example 5) Synthesis of Precursor 5

To a 500 mL three-necked flask were charged 197.2 g of ε-caprolactone and 18.2 g of 4-(2-hydroxyethyl)morpholine. These were stirred and dissolved while blowing in nitrogen. A 0.1 g quantity of monobutyltin oxide was added and the mixture was heated to 100° C. After 8 hours, the disappearance of the starting materials was confirmed by gas chromatography. The mixture was then cooled to room temperature, yielding 200 g of Precursor 5 (of the structure given below) in the form of a solid.

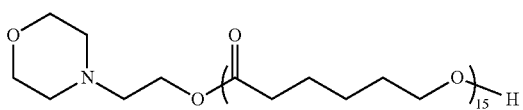

Examples of Synthesizing Compounds Denoted by Formula (1)

(Synthesis Example 6) Synthesis of Reaction Product 1

To a 200 mL three-necked flask were charged 40.0 g of Precursor 1. This was stirred and dissolved at 80° C. while blowing in nitrogen. A 2.2 g quantity of meso-butane-1,2,3,4-tetracarboxylic acid dianhydride was added and the mixture was heated to 110° C. After 5 hours, the disappearance of the starting materials was confirmed by $^1$H-NMR. The mixture was then cooled to room temperature, yielding 38 g of Reaction Product 1 (a mixture of the following structural isomers) in the form of a solid.

Reaction Product 1

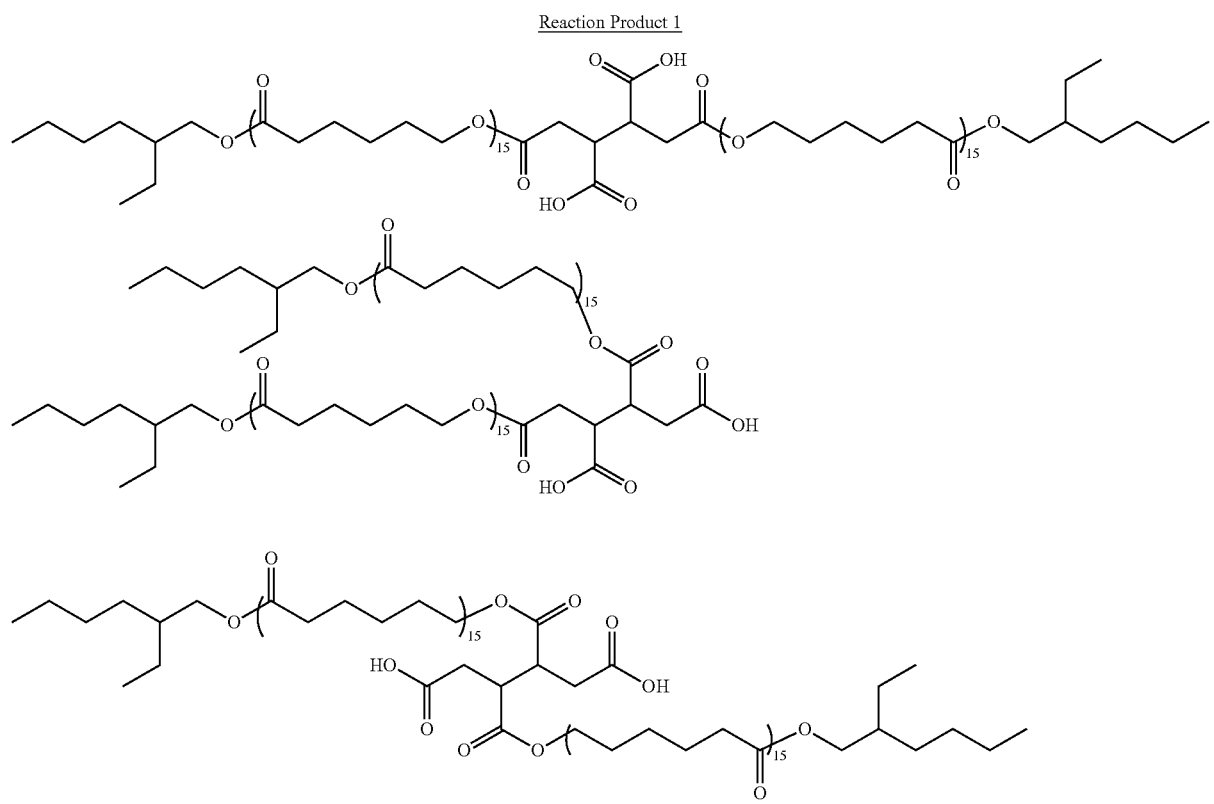

(Synthesis Example 7) Synthesis of Reaction Product 2

With the exception that the 2.2 g of butane tetracarboxylic acid anhydride in Synthesis Example 6 was replaced with 2.4 g of pyromellitic acid dianhydride, synthesis was conducted in the same manner as in Synthesis Example 6. This yielded 38 g of Reaction Product 2 (a mixture of the following structural isomers) in the form of a solid.

Reaction Product 2

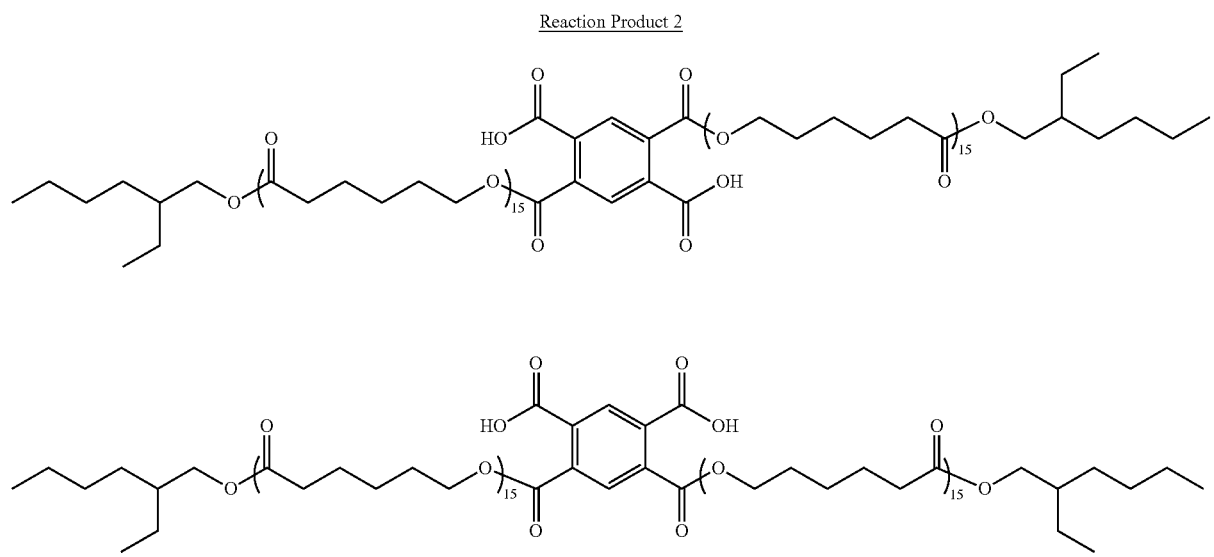

(Synthesis Example 8) Synthesis of Reaction Product 3

With the exception that the 2.2 g of butane tetracarboxylic acid anhydride in Synthesis Example 6 was replaced with 3.0 g of 2,3,6,7-naphthalenetetracarboxylic acid dianhydride, synthesis was conducted in the same manner as in Synthesis Example 6. This yielded 39 g of Reaction Product 3 (a mixture of the following structural isomers) in the form of a solid.

Reaction Product 3

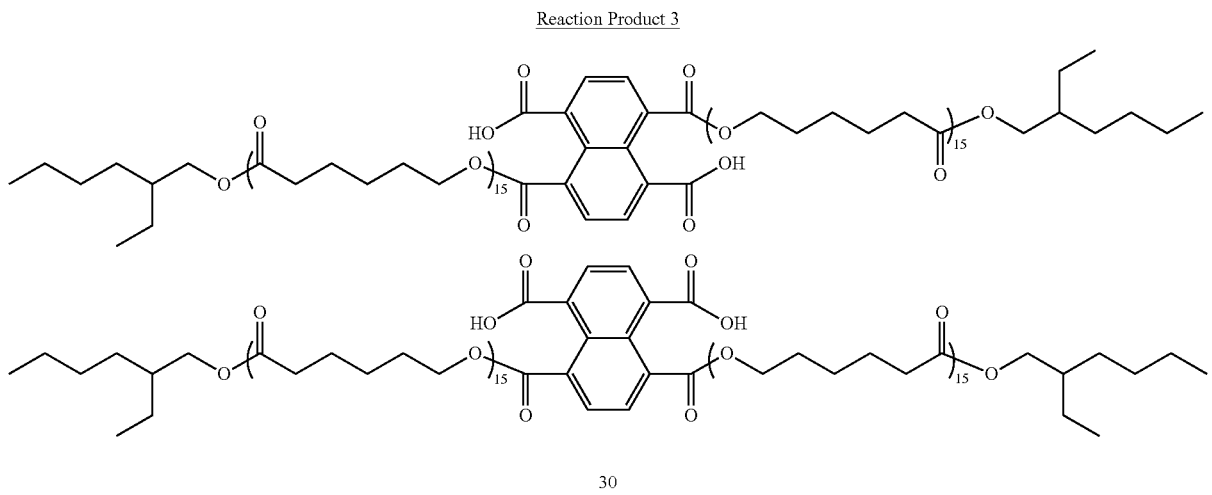

(Synthesis Example 9) Synthesis of Reaction Product 4

With the exception that the 2.2 g of butane tetracarboxylic acid anhydride in Synthesis Example 6 was replaced with 2.8 g of ethylene diamine tetraacetic acid dianhydride, synthesis was conducted in the same manner as in Synthesis Example 6. This yielded 39 g of Reaction Product 4 (a compound with the following structure) in the form of a solid.

Reaction Product 4

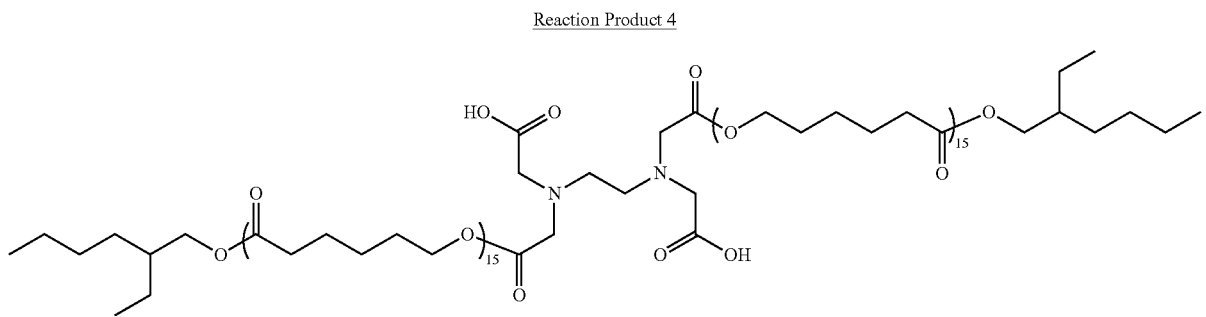

(Synthesis Example 10) Synthesis of Reaction Product 5

With the exception that the 2.2 g of butane tetracarboxylic acid anhydride in Synthesis Example 6 was replaced with 3.6 g of 3,3',4,4'-benzophenone tetracarboxylic acid dianhydride, synthesis was conducted in the same manner as in Synthesis Example 6. This yielded 40 g of Reaction Product 5 (a mixture of the following structural isomers) in the form of a solid.

Reaction Product 5

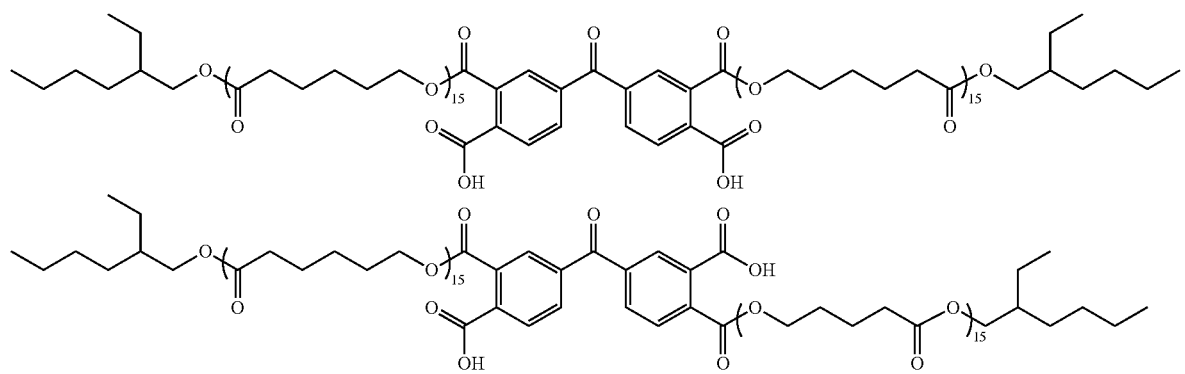

(Synthesis Example 11) Synthesis of Reaction Product 6

With the exception that the 2.2 g of butane tetracarboxylic acid anhydride in Synthesis Example 6 was replaced with 2.9 g of 5-(2,5-dioxotetrahydrofuryl)-3-methyl-3-cyclohexene-1,2-dicarboxylic acid dianhydride, synthesis was conducted in the same manner as in Synthesis Example 6. This yielded 40 g of Reaction Product 6 (a mixture of the following structural isomers) in the form of a solid.

Reaction Product 6

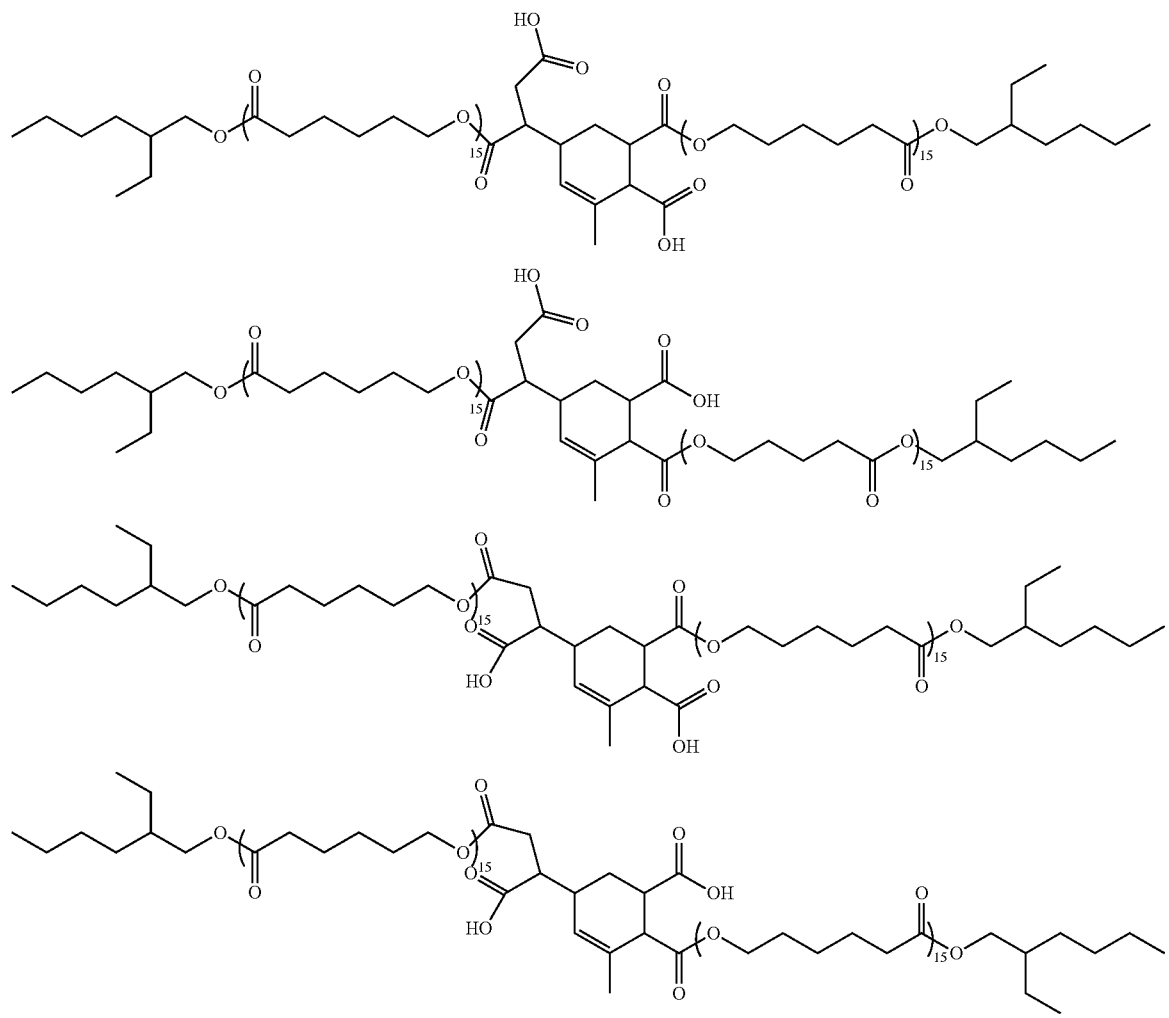

(Synthesis Example 12) Synthesis of Reaction Product 7

With the exception that Precursor 1 (40.0 g) in Synthesis Example 6 was replaced with Precursor 2 (40.7 g), synthesis was conducted in the same manner as in Synthesis Example 6. This yielded 38 g of Reaction Product 7 (a mixture of the following structural isomers) in the form of a solid.

Reaction Product 7

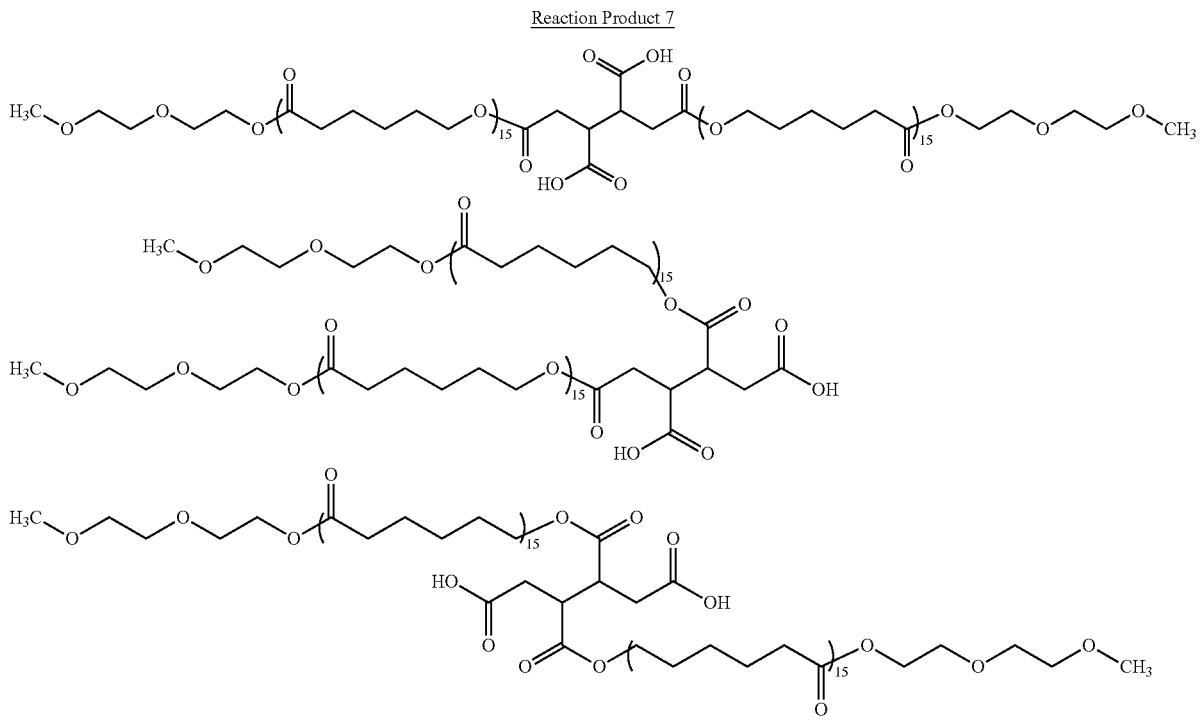

(Synthesis Example 13) Synthesis of Reaction Product 8

With the exception that Precursor 1 (40.0 g) in Synthesis Example 6 was replaced with Precursor 3 (39.5 g), synthesis was conducted in the same manner as in Synthesis Example 6. This yielded 37 g of Reaction Product 8 (a mixture of the following structural isomers) in the form of a solid.

Reaction Product 8

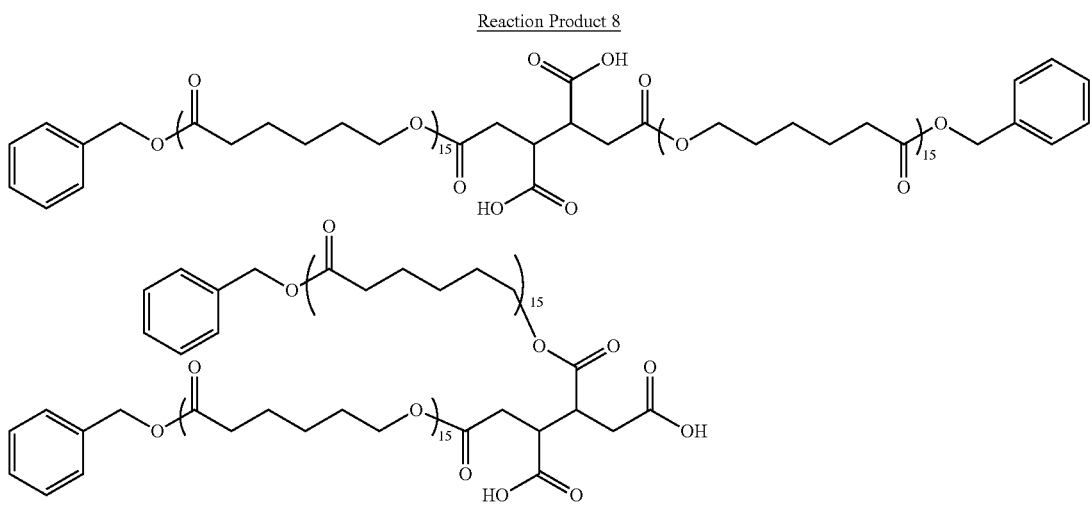

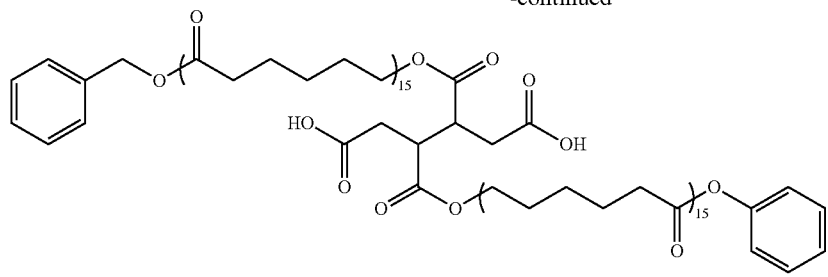

(Synthesis Example 14) Synthesis of Reaction Product 9

With the exception that Precursor 1 (40.0 g) in Synthesis Example 6 was replaced with Precursor 4 (42.3 g), synthesis was conducted in the same manner as in Synthesis Example 6. This yielded 38 g of Reaction Product 9 (a mixture of the following structural isomers) in the form of a solid.

Reaction Product 9

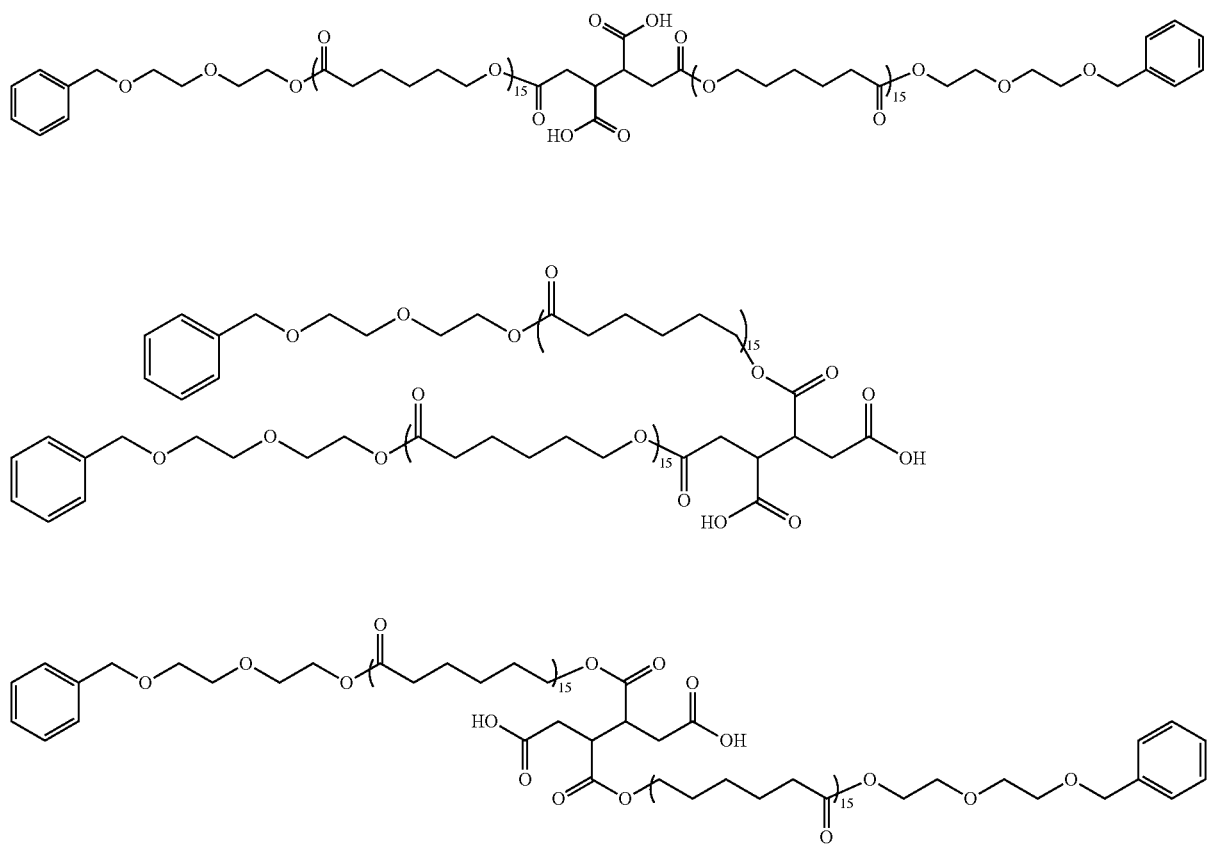

(Synthesis Example 15) Synthesis of Reaction Product 10

With the exception that Precursor 1 (40.0 g) in Synthesis Example 6 was replaced with Precursor 5 (40.5 g), synthesis was conducted in the same manner as in Synthesis Example 6. This yielded 37 g of Reaction Product 10 (a mixture of the following structural isomers) in the form of a solid Reaction Product 10

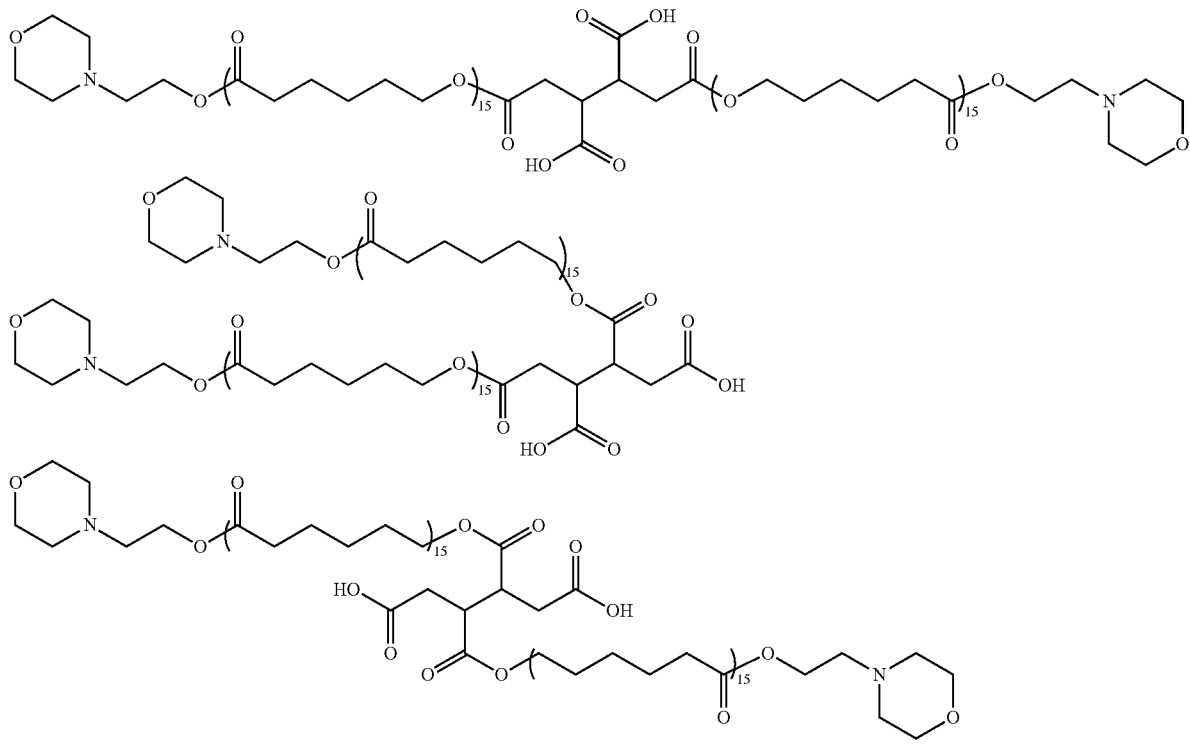

(Synthesis Example 16) Synthesis of Reaction Product 11

With the exception that the 2.2 g of butane tetracarboxylic acid anhydride in Synthesis Example 6 was replaced with 3.4 g of 4,4'-oxydiphthalic acid anhydride, synthesis was conducted in the same manner as in Synthesis Example 6. This yielded 38 g of Reaction Product 11 (a mixture of the following structural isomers) in the form of a solid.

(Synthesis Example 17) Synthesis of Reaction Product 12

With the exception that the 2.2 g of butane tetracarboxylic acid anhydride in Synthesis Example 6 was replaced with 4.0 g of 4,4'-sulfonyldiphthalic acid anhydride, synthesis was conducted in the same manner as in Synthesis Example 6. This yielded 39 g of Reaction Product 12 (a mixture of the following structural isomers) in the form of a solid.

Reaction Product 11

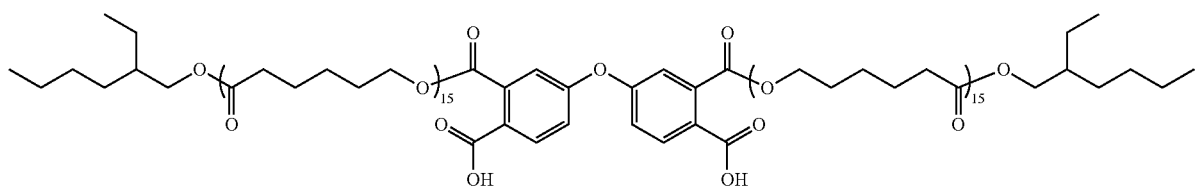

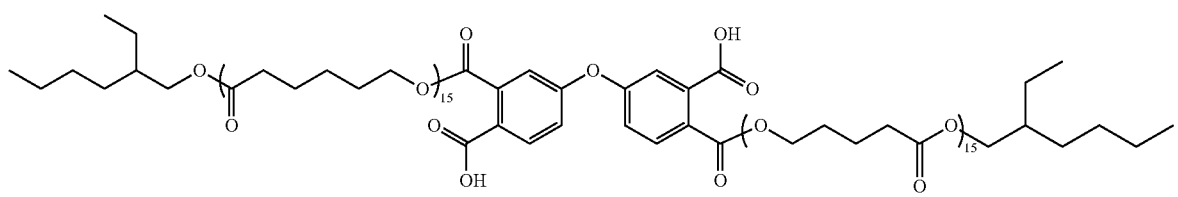

Reaction Product 12

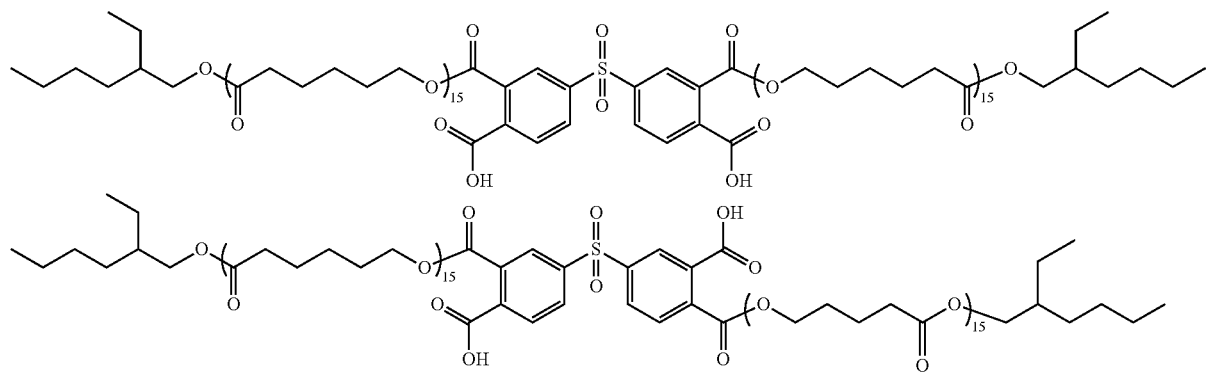

(Synthesis Example 18) Synthesis of Reaction Product 13

With the exception that the 2.2 g of butane tetracarboxylic acid anhydride in Synthesis Example 6 was replaced with 4.9 g of 4,4'-(hexafluoroisopropylidene)diphthalic acid anhydride, synthesis was conducted in the same manner as in Synthesis Example 6. This yielded 40 g of Reaction Product 13 (a mixture of the following structural isomers) in the form of a solid.

Reaction Product 13

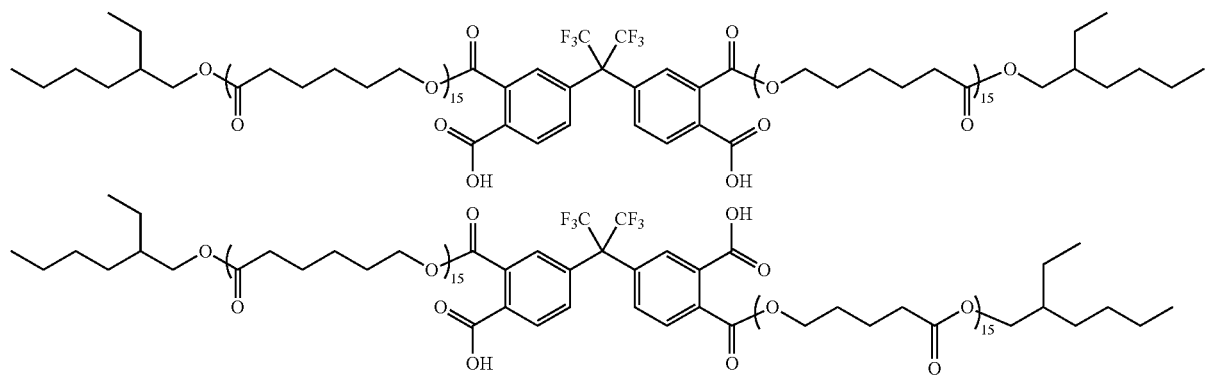

Measured values and theoretical values of the acid value of the reaction products obtained in Synthesis Examples 6 to 18 are given in Table 1. As defined in JIS K 2501 (2003), the acid value is the number of milligrams (mg) of potassium hydroxide (KOH) required to neutralize the acid component contained in 1 g of sample. In Synthesis Examples 6 to 18, compounds of the above structure comprising two carboxyl groups in Z in Formula (1) were produced. Accordingly, the theoretical acid value was calculated as "molecular weight of KOH×quantity of tetracarboxylic acid anhydride employed in each synthesis example (unit: mmol)/combined weight of tetracarboxylic acid anhydride and precursor employed in each synthesis example (unit: g)". As shown in Table 1, there was no major difference between the measured acid value and the theoretical acid value. Thus, nearly the entire quantity in the reaction product was determined to be the above compound denoted by Formula (1).

TABLE 1

| Synthesis Example | Reaction product | Acid value Upper: measured value (Lower: theoretical value) (Unit: mgKOH/g) |
| --- | --- | --- |
| Synthesis Example 6 | Reaction product 1 | 0.58 (0.53) |
| Synthesis Example 7 | Reaction product 2 | 0.53 (0.52) |

TABLE 1-continued

| Synthesis Example | Reaction product | Acid value Upper: measured value (Lower: theoretical value) (Unit: mgKOH/g) |
| --- | --- | --- |
| Synthesis Example 8 | Reaction product 3 | 0.58 (0.52) |
| Synthesis Example 9 | Reaction product 4 | 0.59 (0.51) |
| Synthesis Example 10 | Reaction product 5 | 0.59 (0.51) |
| Synthesis Example 11 | Reaction product 6 | 0.66 (0.52) |
| Synthesis Example 12 | Reaction product 7 | 0.57 (0.51) |
| Synthesis Example 13 | Reaction product 8 | 0.58 (0.53) |

TABLE 1-continued

| Synthesis Example | Reaction product | Acid value Upper: measured value (Lower: theoretical value) (Unit: mgKOH/g) |
|---|---|---|
| Synthesis Example 14 | Reaction product 9 | 0.54 (0.49) |
| Synthesis Example 15 | Reaction product 10 | 0.60 (0.52) |
| Synthesis Example 16 | Reaction product 11 | 0.59 (0.51) |
| Synthesis Example 17 | Reaction product 12 | 0.61 (0.51) |
| Synthesis Example 18 | Reaction product 13 | 0.60 (0.51) |

<Preparation of Coating Composition for Magnetic Recording Media (Coating Liquid for Forming the Magnetic Layer)>
(Formula of Composition)
Plate-shaped ferromagnetic hexagonal ferrite powder: 100 parts
  Composition excluding oxygen (molar ratio): Ba/Fe/Co/Zn=1/9/0.2/1
  Hc: 160 kA/m (2,000 Oe)
  Average plate diameter: 20 nm
  Average plate ratio: 2.7
  BET (Brunauer-Emmett-Teller) specific surface area: 60 m$^2$/g
  σs: 46 A·m$^2$/kg (46 emu/g)
Reaction product (see Table 2) obtained in one of Synthesis Examples 6 to 18: 10.0 parts
Polyurethane resin (Vylon (Japanese registered trademark) UR4800 made by Toyobo Corp.; functional group: SO$_3$Na; function group concentration: 70 eq/t; weight average molecular weight: 70,000): 4.0 parts
Vinyl chloride resin (MR104 made by Kaneka Corp, weight average molecular weight: 55,000): 10.0 parts
α-Al$_2$O$_3$ (average particle size: 0.1 µm): 8.0 parts
Carbon black (average particle size: 0.08 µm): 0.5 parts
Cyclohexanone: 110.0 parts
  (Preparation of Composition)
After kneading the various above components in an open kneader, they were dispersed using a sand mill. The following components were added to the dispersion obtained, the mixture was stirred, and ultrasonic processing was conducted. The mixture was filtered with a filter having an average pore diameter of 1 µm, yielding a coating composition for a magnetic recording medium.
Butyl stearate: 1.5 parts
Stearic acid: 0.5 part
Amide stearate: 0.2 part
Methyl ethyl ketone: 50.0 parts
Cyclohexanone: 50.0 parts
Toluene: 3.0 parts
Polyisocyanate compound (Coronate 3041 made by Nippon Polyurethane Industry Co., Ltd.): 2.5 parts
<Evaluation of Dispersion>
A 0.5 mL quantity of the composition prepared above was collected and diluted 25-fold with a mixed solution of methyl ethyl ketone (MEK)/cyclohexanone=6/4 (volumetric ratio) to prepare a dispersion for evaluation. The transmittance of the dispersion at a wavelength of 450 nm was measured with a UV-3600 made by Shimadzu Corp. and evaluated based on the following scale. The more ferromagnetic powder aggregated or precipitated in a liquid with a low dispersion property, the higher the transmittance of the liquid (supernatant). Thus, the lower the transmittance, the better the dispersion was determined to be.
A: Transmittance of 0% to 5.0%
B: Transmittance of greater than or equal to 5.1%
<Evaluation of Durability>
  (Fabrication of Film for Evaluation of Durability)
  Reaction product obtained in one of Synthesis Examples 6 to 18 (see Table 2): 10.0 parts
  Polyurethane resin (Vylon (Japanese registered trademark) UR4800 made by Toyobo Co., Ltd.): 4.0 parts
  Vinyl chloride resin (MR104 made by Kaneka Corp.): 10.0 parts
  A mixture obtained by mixing the above components was cooled to less than or equal to 10° C. Following cooling, 5.0 weight parts of a polyisocyanate (Coronate 3041, made by Nippon Polyurethane Industry Co., Ltd.) solution (solid component 2.5 parts, toluene 1.25 parts, methyl ethyl ketone (2-butanone) 1.25 parts) were added to the mixture. Cyclohexanone was then added to dissolve the solid component to 22%.
  The composition for fabricating a film that had been prepared by the above method was coated with a doctor blade having a gap of 300 µm on a base film (Torelina (Japanese registered trademark) film 3000 made by Toray Industries, Inc.) and vacuum dried under conditions of 140° C. for 30 minutes. The dry film obtained was cooled to room temperature and then annealed under conditions of 100° C. for two days. Following annealing, the film was cooled to room temperature and peeled off the base film, yielding a film for evaluating durability.
  (Evaluation of Durability (Measurement of Breaking Energy))
  The film for evaluating durability that had been obtained was cut to a width of 6.35 mm and a distance between chucks of 50 mm. The distance between chucks was set to 50 mm on a Toyoseiki Strograph V1-C made by Toyobo Co., Ltd. The cut film sample was positioned, and a film tensile test was conducted at a test speed of 50 mm/min to measure the elongation and stress in the sample. The load (kgf) when the film broke was adopted as the breaking weight. The value obtained by dividing the breaking weight that was obtained by the film cross-section (µm$^2$) and multiplying by 9.8 was adopted as the breaking stress (MPa). The elongation when the film broke was adopted as the elongation at break. The breaking energy was obtained as the integrated value of the region with the point of intersection of the breaking stress and the elongation at break of the elongation-stress curve obtained by plotting the measured elongation on the X-axis and the stress on the Y-axis as the end point. The higher the breaking energy, the greater the film strength and the better the durability indicated.
<Fabrication and Evaluation of Magnetic Tape>
  (Preparation of Coating Liquid for Forming Nonmagnetic Layer)
Nonmagnetic powder (aFe$_2$O$_3$ hematite): 80.0 parts
  Average particle size (average major axis length): 0.15 µm
  Specific surface area by BET method: 52 m$^2$/g
  pH: 6
  Tap density: 0.8
  DBP (dibutyl phthalate) oil absorption capacity: 27 to 38 g/100 g
  Surface treatment agents: Al$_2$O$_3$, SiO$_2$
Carbon black: 20.0 parts
  Average particle diameter: 0.020 µm
  DBP oil absorption capacity: 80 mL/100 g
  pH: 8.0
  Specific surface area by BET method: 250 m$^2$/g
  Volatile component: 1.5%

Polyurethane resin: 19.0 parts
  Polyester polyol with branch side chains/diphenyl methane diisocyanate —SO$_3$Na=100 eq/ton
Methyl ethyl ketone: 150.0 parts
Cyclohexanone: 150.0 parts After kneading the various above components in an open kneader, they were dispersed using a sand mill. The following components were added to the dispersion obtained, the mixture was stirred, and filtering was conducted with a filter having an average pore diameter of 1 μm to prepare a coating liquid for forming a nonmagnetic layer.

Butyl stearate: 1.5 parts
Stearic acid: 1.0 part
Methyl ethyl ketone: 50.0 parts
Cyclohexanone: 50.0 parts
Toluene: 3.0 parts
Polyisocyanate compound (Coronate 3041, made by Nippon Polyurethane Industry Co., Ltd.): 5.0 parts
  (Preparation of Coating Liquid for Forming Backcoat Layer)
Carbon black (average particle size: 40 nm): 85.0 parts
Carbon black (average particles size: 100 nm): 3.0 parts
Nitrocellulose: 28.0 parts
Polyurethane resin: 58.0 parts
Copper phthalocyanine dispersing agent: 2.5 parts
Nipporan 2301 (Nippon Polyurethane Industry Co., Ltd.): 0.5 part
Methyl isobutyl ketone: 0.3 part
Methyl ethyl ketone: 860.0 parts
Toluene: 240.0 parts The above components were prekneaded in a roll mill and then dispersed in a sand mill. To the dispersion were then added 4.0 parts of polyester resin (Vylon 500, made by Toyobo Co., Ltd.), 14.0 parts of polyisocyanate compound (Coronate 3041, made by Nippon Polyurethane Industry Co., Ltd.), and 5.0 parts of α-Al$_2$O$_3$ (made by Sumitomo Chemical Co., Ltd.). The mixture was stirred and filtered to prepare a coating liquid for forming a backcoat layer.

ylene naphthalate support, the above coating liquid for forming a nonmagnetic layer was coated in a manner calculated to yield a dry thickness of 1.0 μm. Immediately thereafter, the coating liquid for forming a magnetic layer was coated thereover in a manner calculated to yield a magnetic layer thickness of 100 nm in simultaneous multi-layer coating. While the two layers were still wet, orientation processing was conducted with a cobalt magnet having a magnetic force of 0.5 T (5,000 G) and a solenoid having a magnetic force of 0.4 T (4,000 G). The layers were then subjected to a drying treatment. Subsequently, the coating liquid for forming a backcoat layer was coated in a manner calculated to yield a dry thickness of 0.5 μm on the other surface of the polyethylene naphthalate support. Processing was then conducted at a rate of 80 m/min at a temperature of 100° C. with a seven-stage calender comprised solely of metal rolls and the product was slit to a width of ½ inch (0.0127 m) to fabricate a magnetic tape.

<Scratch Resistance Test>

A scratch resistance test was conducted on the surface of the magnetic layer of the above magnetic tape with an automatic friction and abrasion analyzer (Triboster TS501: made by Kyowa Interface Science Co., Ltd.) based on a horizontal linear back and forth sliding system under conditions of a contactor: 3 mmΦ in diameter, ball load: 3 g, speed: 3 mm/s, number of measurements: 10 passes back and forth. The surface of the magnetic layer after the test was observed by optical microscope (magnification: 100 to 500-fold) and the scratch resistance was evaluated based on the following scale.

A: No scratching observed on the surface of the magnetic layer
B: Slight scratching observed on the surface of the magnetic layer
C: Deep scratching observed on the surface of the magnetic layer, with the shaved component being deposited on the surface of the magnetic layer The results of the above are given in Table 2.

TABLE 2

| | Compound added to the magnetic layer (Reaction product prepared in synthesis Example) | | | Evaluation result of durability | | | |
|---|---|---|---|---|---|---|---|
| | Synthesis Example in which the reaction product was prepared | Weight average molecular weight | Evaluation result of dispersion (transmittance) | Breaking energy (J/m$^3$) | Breaking stress (MPa) | Elongation at break (%) | Evaluation result of scratch resistance test |
| Ex. 1 | Synthesis Example 6 | 9200 | A(2%) | 1350 | 18 | 137 | A |
| Ex. 2 | Synthesis Example 7 | 6300 | A(2%) | 1220 | 25 | 90 | A |
| Ex. 3 | Synthesis Example 8 | 5300 | A(2%) | 1210 | 26 | 85 | A |
| Ex. 4 | Synthesis Example 9 | 8000 | A(2%) | 985 | 15 | 120 | A |
| Ex. 5 | Synthesis Example 10 | 8700 | A(2%) | 1200 | 22 | 100 | A |
| Ex. 6 | Synthesis Example 11 | 8600 | A(2%) | 1100 | 20 | 100 | A |
| Ex. 7 | Synthesis Example 12 | 6200 | A(2%) | 1060 | 13 | 150 | A |
| Ex. 8 | Synthesis Example 13 | 8000 | A(2%) | 1390 | 14 | 139 | A |
| Ex. 9 | Synthesis Example 14 | 9000 | A(2%) | 1050 | 12 | 150 | A |
| Ex. 10 | Synthesis Example 15 | 10600 | A(2%) | 1200 | 23 | 80 | A |
| Ex. 11 | Synthesis Example 16 | 6100 | A(2%) | 1280 | 30 | 80 | A |
| Ex. 12 | Synthesis Example 17 | 6600 | A(2%) | 1260 | 28 | 80 | A |
| Ex. 13 | Synthesis Example 18 | 6400 | A(2%) | 1200 | 25 | 85 | A |
| Comp. Ex. 1 | None | — | B(80%) | 230 | 69 | 7 | C |

(Fabrication of Magnetic Tape)

Both surfaces of a polyethylene naphthalate support (5 μm in thickness, centerline surface roughness of surface on side on which magnetic layer formed: 1 nm) were subjected to a corona discharge treatment. On one surface of the polyeth- As shown in Table 2, enhanced dispersion of ferromagnetic powder was achieved by means of the compound denoted by Formula (1). The magnetic tapes of Examples having a magnetic layer containing the compound denoted by Formula (1) exhibited good scratch resistance of the magnetic layer. From the values of the breaking energy, breaking stress, and elongation at break shown in Table 2, it was determined that the tendency to elongate (elongation at break) of Examples was much improved over that of Comparative Example. On that basis, the compound denoted by Formula (1) was thought to contribute to enhancing the durability (scratch resistance) of the magnetic layer by imparting a suitable tendency to elongate to the magnetic layer. Based on these results, an aspect of the present invention was determined to make it possible to achieve both improved dispersion of ferromagnetic powder and improved durability of the magnetic layer.

<Fabrication and Evaluation of Magnetic Tapes>
(Fabrication of Magnetic Tapes of Examples 14 to 16>
With the exception that the coating liquids (coating compositions) for forming a magnetic layer containing ferromagnetic metal powder set forth below were employed, magnetic tapes were fabricated in the same manner as in the above Examples.

—Preparation of Coating Liquid (Coating Composition) for Forming Magnetic Layer Containing Ferromagnetic Metal Powder—

Ferromagnetic metal powder: 100.0 parts
  Composition: Fe/Co=100/25
  Hc: 195 kA/m (2,450 Oe)
  Specific surface area by BET method: 65 m$^2$/g
  Surface treatment agents: $Al_2O_3$, $SiO_2$, $Y_2O_3$
  Average particle size (average major axis length): 45 nm
  Average acicular ratio: 5
  σs: 110 A·m$^2$/kg (110 emu/g)
Reaction product (see Table 3) obtained in synthesis examples: 10.0 parts
Polyurethane resin (Vylon (Japanese registered trademark) UR4800, made by Toyobo Co., Ltd., functional group: $SO_3Na$, functional group concentration: 70 eq/t): 5.0 parts
Vinyl chloride resin (MR104 made by Kaneka Co., Ltd.): 10.0 parts
Methyl ethyl ketone: 150.0 parts
Cyclohexanone: 150.0 parts
Abrasive: α-$Al_2O_3$ Mohs hardness 9 (average particle size: 0.1 μm): 15.0 parts
Carbon black (average particles size: 0.08 μm): 0.5 parts The coating liquid was prepared as follows. The above various components were kneaded in an open kneader and then dispersed in a sand mill. The following components were then added to the dispersion obtained and the mixture was stirred. Ultrasonic processing was conducted and the mixture was filtered with a filter having an average pore diameter of 1 μm to obtain a coating liquid for forming a magnetic layer.

Butyl stearate: 1.5 parts
Stearic acid: 0.5 part
Amide stearate: 0.2 part
Methyl ethyl ketone: 50.0 parts
Cyclohexanone: 50.0 parts
Toluene: 3.0 parts
Polyisocyanate compound (Coronate 3041, made by Nippon Polyurethane Industry Co., Ltd.): 5.0 parts The magnetic tapes of Examples 14 to 16 and the magnetic tapes of Examples 1 to 3 were subjected to the following evaluation. The results are given in Table 3.

<Average Surface Roughness of Tape>
The centerline average surface roughness (Ra) was measured for a 40 μm×40 μm surface area of the surface of the magnetic layer employing an atomic force microscope (AFM: Nanoscope III made by Digital Instruments Corp.) in contact mode.

<Electromagnetic Characteristics: Signal-to-Noise (S/N) Ratio>
A Linear Tape-Open-Generation 4 (LTO-Gen4) drive made by IBM was employed to record signals at linear recording densities of 172 kfci and 86 kfci at a recording track width of 11.5 μm and a reproduction track width of 5.3 μm. The reproduced signal was frequency analyzed with a spectrum analyzer. The ratio of the output of the carrier signal during 172 kfci signal recording and the integrated noise over the entire spectral band during 86 kfci signal recording was adopted as the S/N ratio. An LTO-Gen4 tape made by FUJIFILM was employed as reference tape. The S/N ratio of the reference tape was adopted as 0.0 dB and the relative values of the S/N ratios of the various tapes were obtained. A S/N ratio of greater than or equal to 1.0 dB was evaluated as indicating good dispersion of ferromagnetic powder of the above average particle size in the magnetic layer (and as a result, good electromagnetic characteristics).

<Running Durability (Shaving of the Surface of the Magnetic Layer)>
In the course of recording information and reproducing information that has been recorded on a magnetic tape, the magnetic head normally slides against the surface of the magnetic layer of the magnetic tape. If this sliding shaves the surface of the magnetic tape and the shavings adhere to the magnetic head, running durability would be compromised. Accordingly, the running durability of the magnetic tapes was evaluated by the following method.

The magnetic tape was passed over a square bar made of $Al_2O_3$/TiC having a cross-section of 7 mm×7 mm such that the surface of the magnetic layer contacted the edge of the bar at an angle of 150 degrees. A single pass was made by sliding a length of 100 m under conditions of a load of 100 g at a speed of 6 m/s. Following the pass, the edge of the square bar was examined under a microscope and the state of adhesion of deposits (the surface of the magnetic layer scraped off by the sliding) that had adhered to the edge of the square bar due to sliding was evaluated. The evaluation was organoleptic evaluation on a 10-point scale. A score of 10 indicated less deposits and 1 indicated maximum deposits. An evaluation score of greater than or equal to 8 meant few deposits (shavings of the surface of the magnetic layer) and good running durability.

TABLE 3

| | | Dispersion | | Running durability Shaving of the |
|---|---|---|---|---|
| Ferromagnetic powder | Synthesis Example in which the reaction product was prepared | Surface property Ra(nm) | S/N ratio (dB) | surface of the magnetic laye (poor)1-10(good) |
| Ex. 1 | Ferromagnetic hexagonal ferrite powder | Synthesis Example 6 | 2.8 | 2.0 | 10 |
| Ex. 2 | | Synthesis Example 7 | 2.8 | 2.0 | 8 |
| Ex. 3 | | Synthesis Example 8 | 2.8 | 1.5 | 8 |
| Ex. 14 | Ferromagnetic metal powder | Synthesis Example 6 | 2.8 | 2.0 | 10 |
| Ex. 15 | | Synthesis Example 7 | 2.8 | 2.0 | 8 |
| Ex. 16 | | Synthesis Example 8 | 2.8 | 1.5 | 8 |

An aspect of the present invention is useful in the field of manufacturing magnetic recording media for high-density recording, such as high-capacity backup tapes.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic recording medium, which comprises a magnetic layer comprising ferromagnetic powder and binder on a nonmagnetic support, and further comprises a compound denoted by Formula (1):

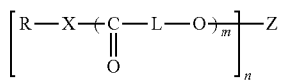

Formula (1)

wherein, in Formula (1),

X denotes —O—, —S—, or NR$^1$—;

R denotes a hydrogen atom or a monovalent substituent selected from the group consisting of the following monovalent substituents, in which "*" denotes the position of the bond with X:

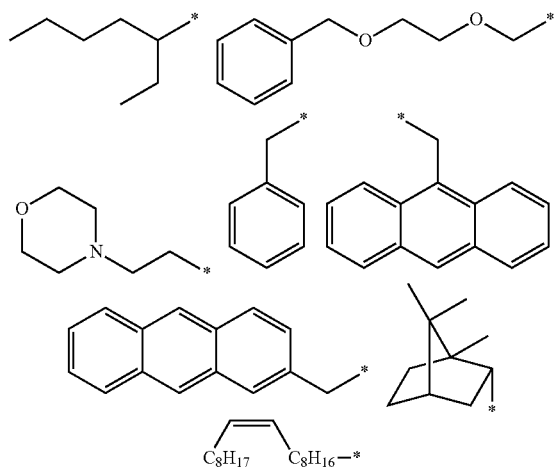

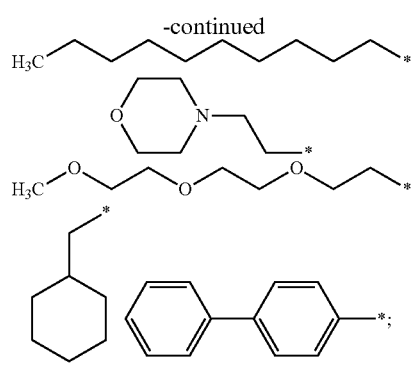

R$^1$ denotes a hydrogen atom or a monovalent substituent selected from the group consisting of an alkyl group with 1 to 6 carbon atoms, a hydroxyl group, an alkoxy group with 1 to 6 carbon atoms, a halogen atom, a cyano group, an amino group, a nitro group, an acyl group, and a carboxyl (salt) group;

L denotes a divalent connecting group which is a linear, branched, or cyclic alkylene group having 1 to 12 carbon atoms;

Z denotes a partial structure of valence n comprising at least one group selected from the group consisting of carboxyl groups and carboxylate groups, and which is a reactive residue of a carboxylic acid anhydride;

m denotes an integer of greater than or equal to 2, n denotes an integer of greater than or equal to 1, and the weight average molecular weight of the compound denoted by Formula (1) falls within a range of greater than or equal to 1,000 but less than 20,000.

2. The magnetic recording medium according to claim 1, wherein, in Formula (1), X denotes —O—.

3. The magnetic recording medium according to claim 1, wherein, in Formula (1), Z denotes a reactive residue of tetracarboxylic acid anhydride.

4. The magnetic recording medium according to claim 1, wherein an average particle size of the ferromagnetic powder ranges from 10 nm to 50 nm.

5. The magnetic recording medium according to claim 1, which comprises the compound denoted by Formula (1) in a content ranging from 0.5 weight part to 50.0 weight parts per 100.0 weight parts of ferromagnetic powder.

6. The magnetic recording medium according to claim 1, wherein the binder is selected from the group consisting of polyurethane resin and vinyl chloride resin.

7. The magnetic recording medium according to claim 1, wherein Z is selected from the group consisting of the following structures:

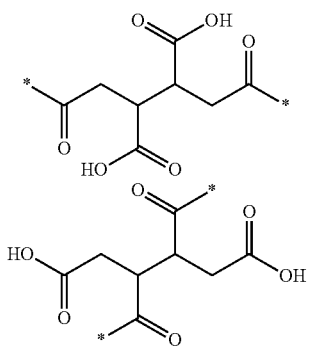

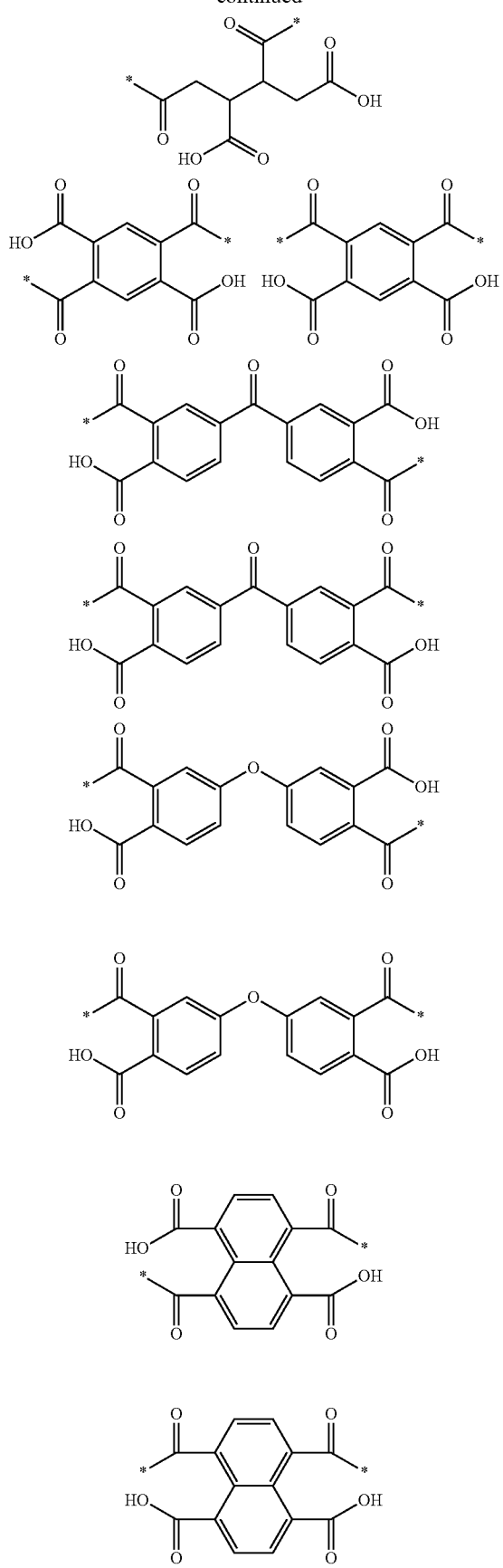
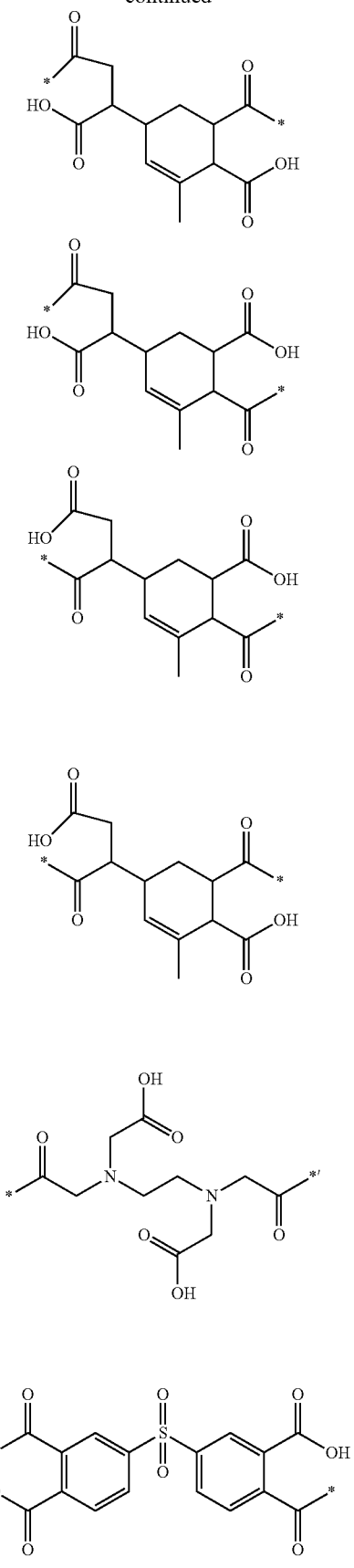

45
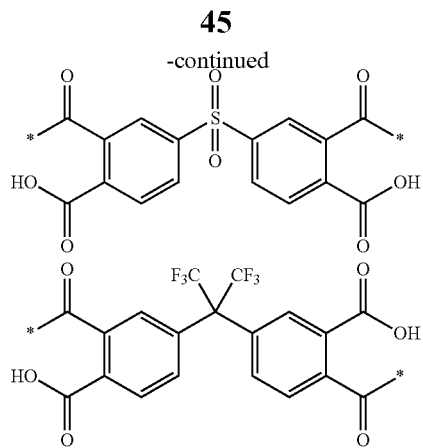
46
-continued
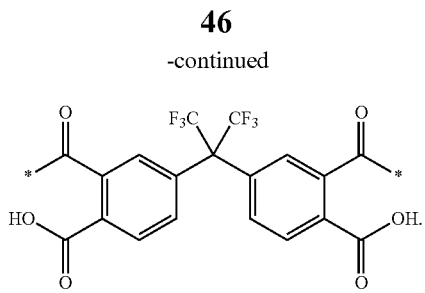
8. The magnetic recording medium according to claim 1, wherein the compound denoted by Formula (1) comprises at least one selected from the group consisting of Reaction Products 1 to 13 shown below:
Reaction Product 1
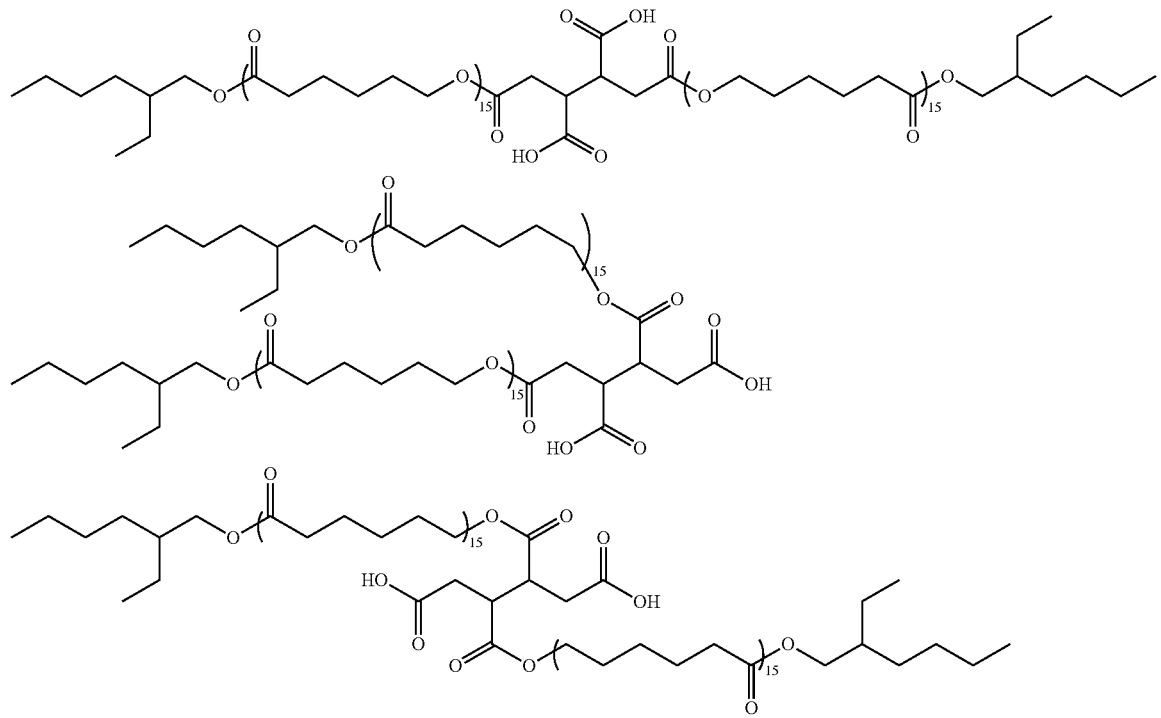
Reaction Product 2
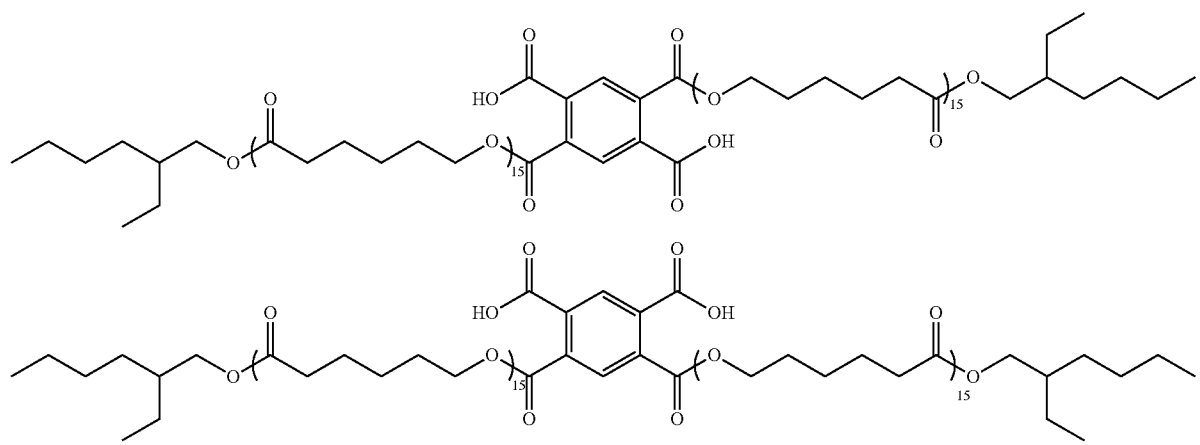

-continued
Reaction Product 3
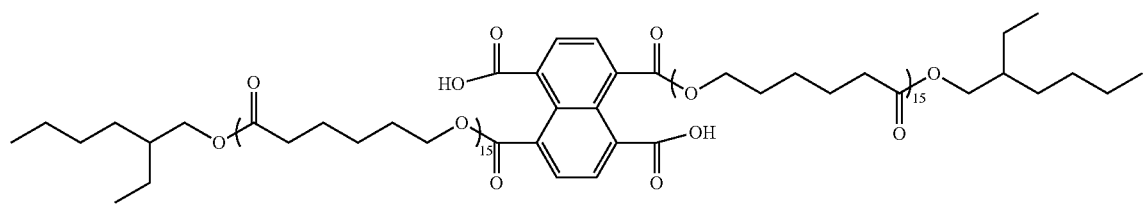
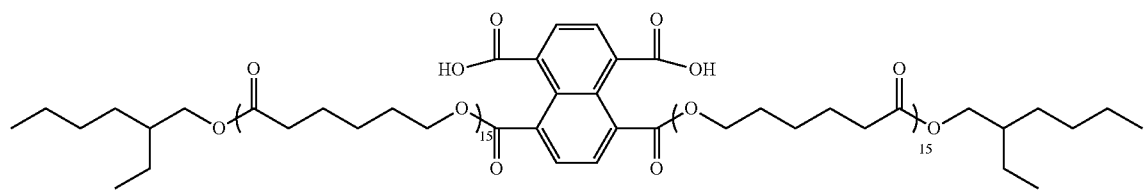
Reaction Product 4
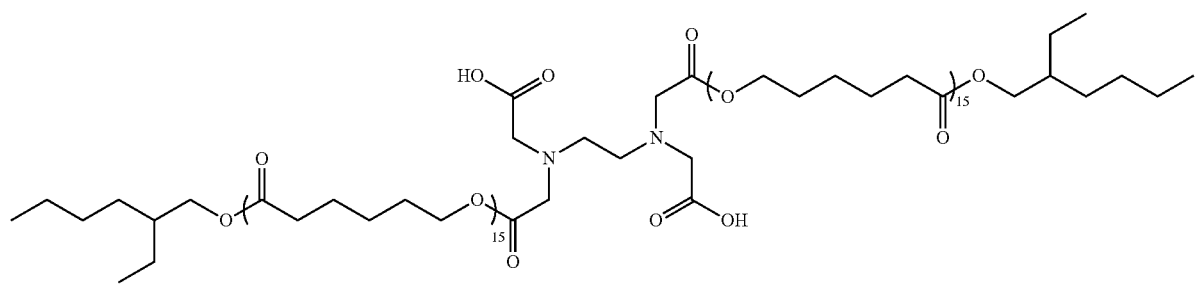
Reaction Product 5
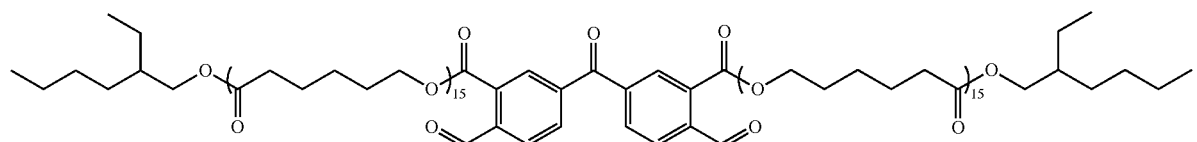
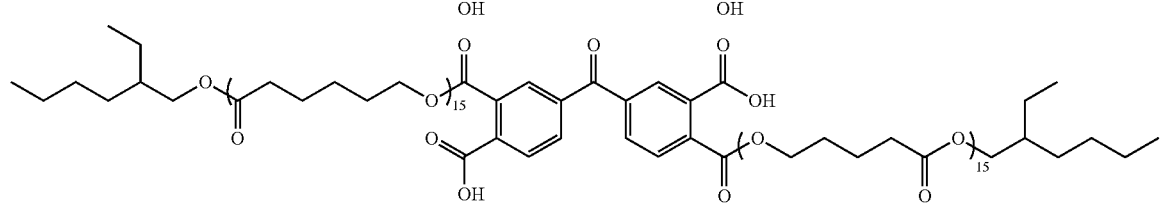
Reaction Product 6
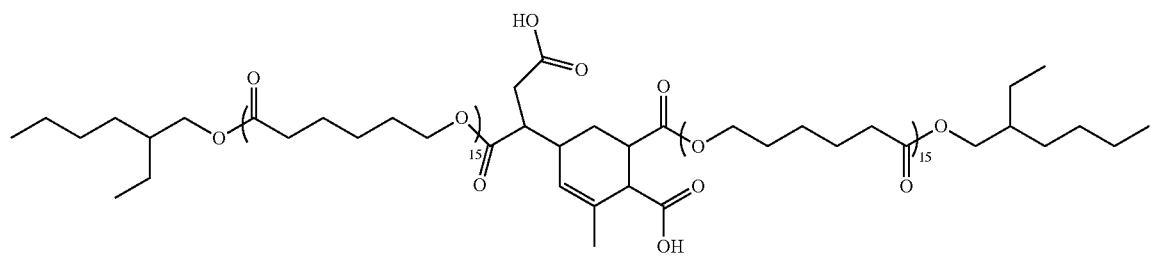
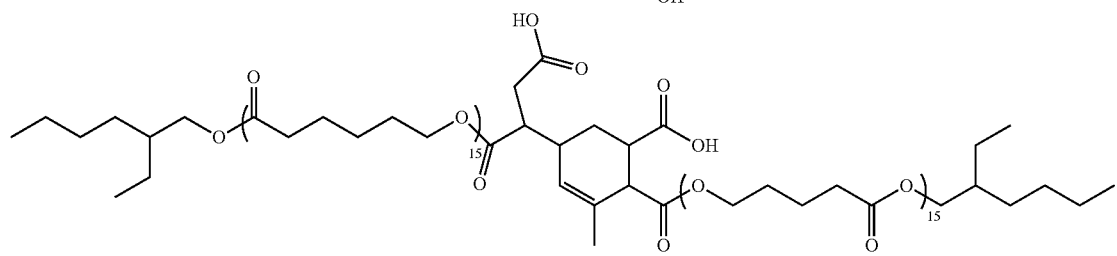

-continued
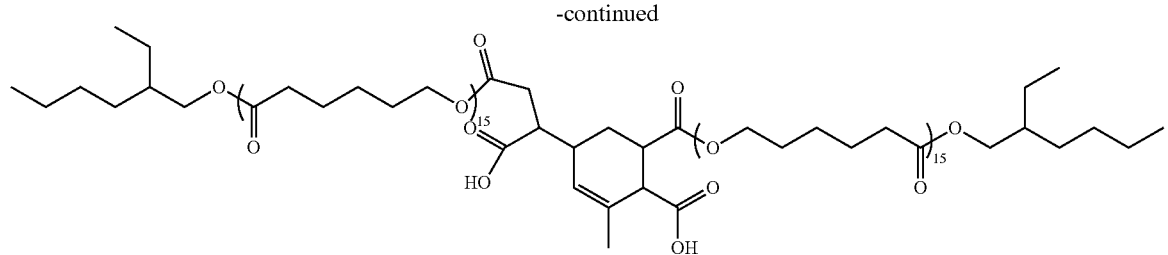
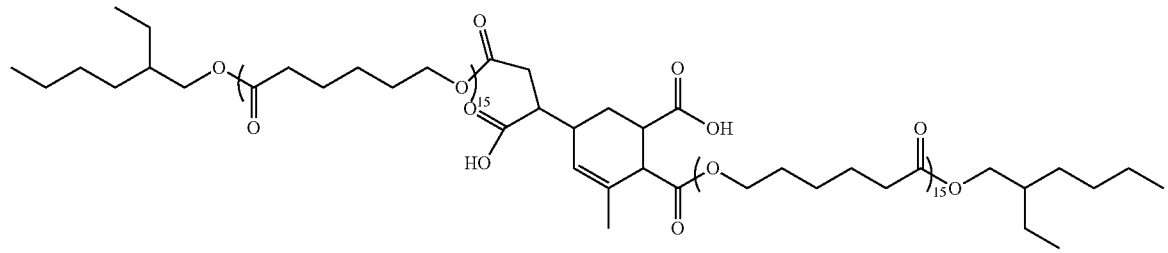
Reaction Product 7
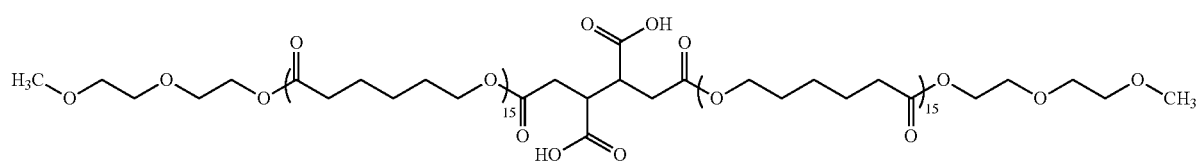
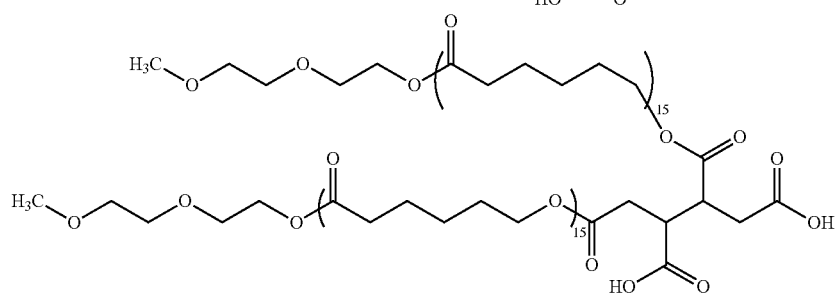
Reaction Product 8
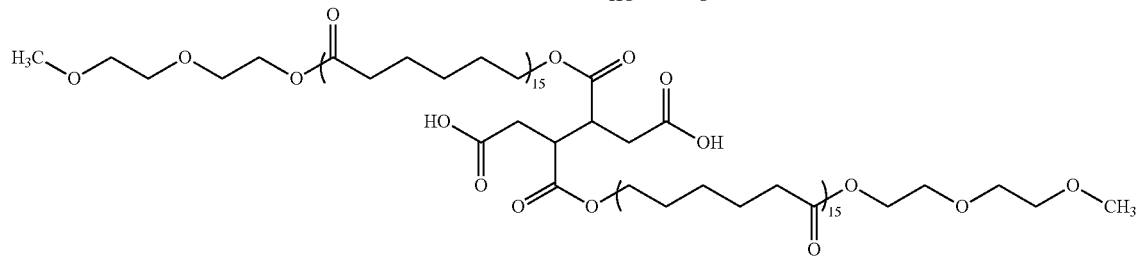
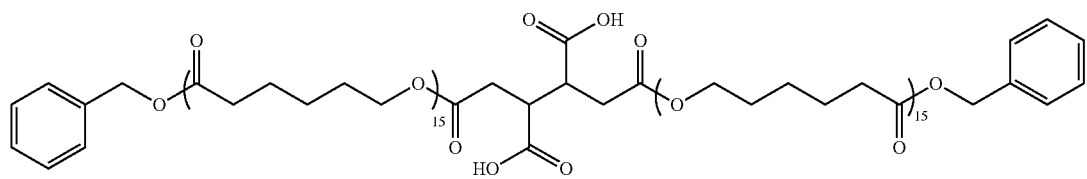
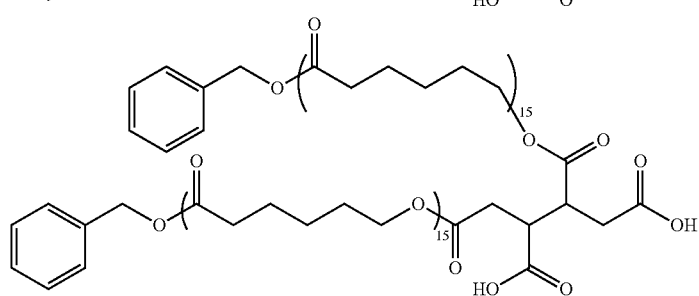

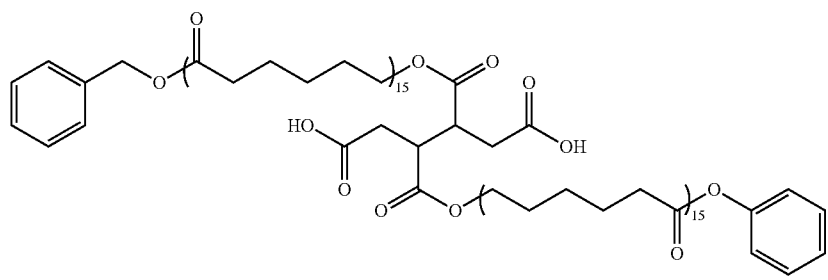
Reaction Product 9
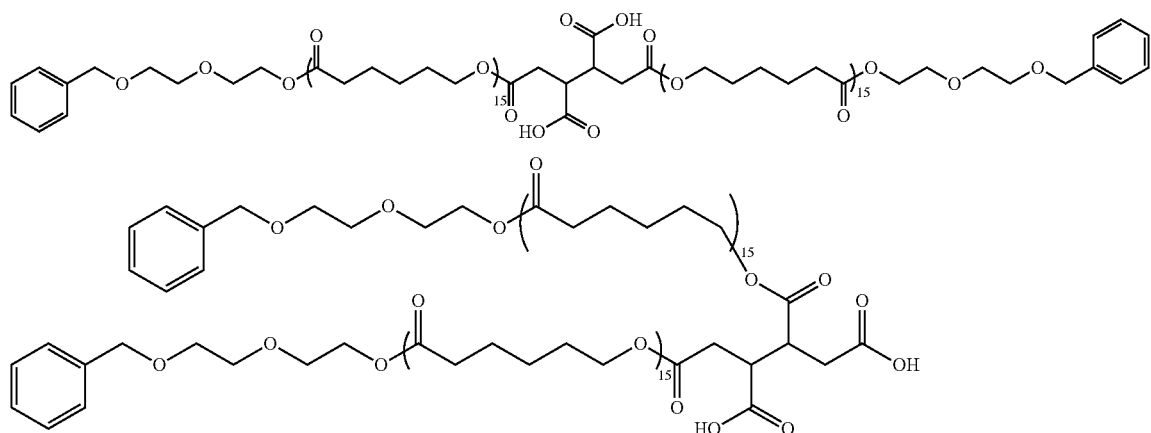
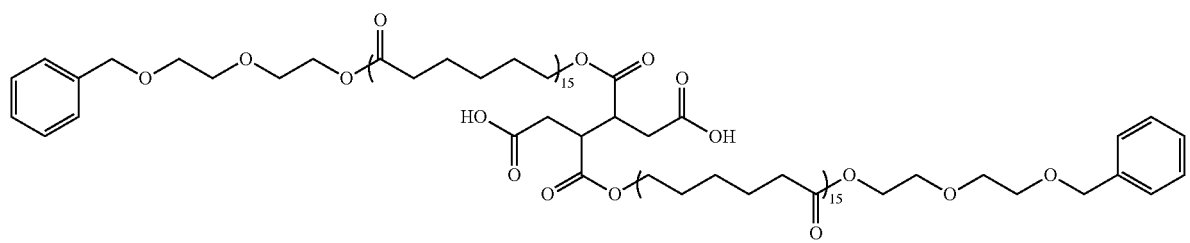
Reaction Product 10
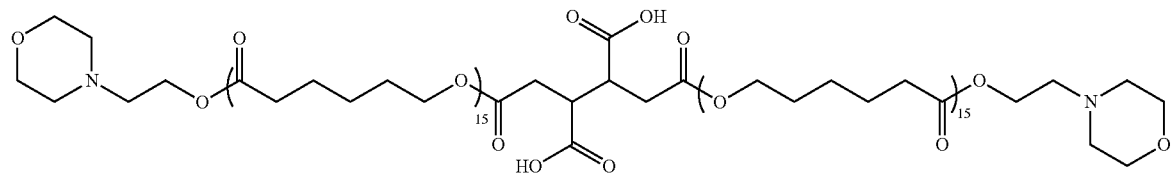
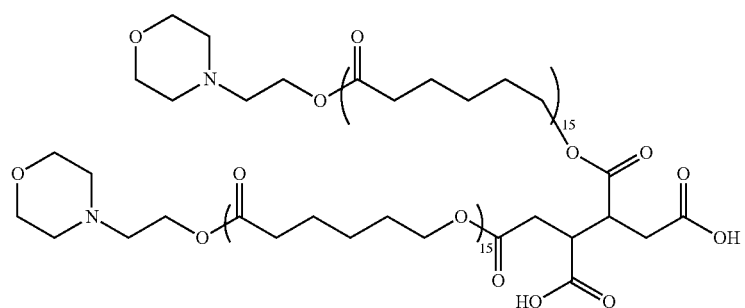

-continued
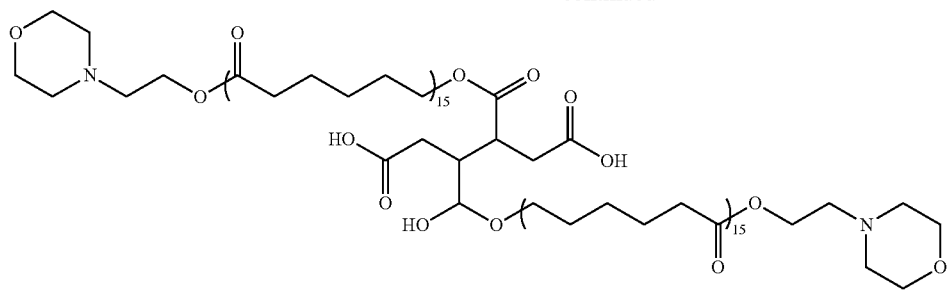
Reaction Product 11
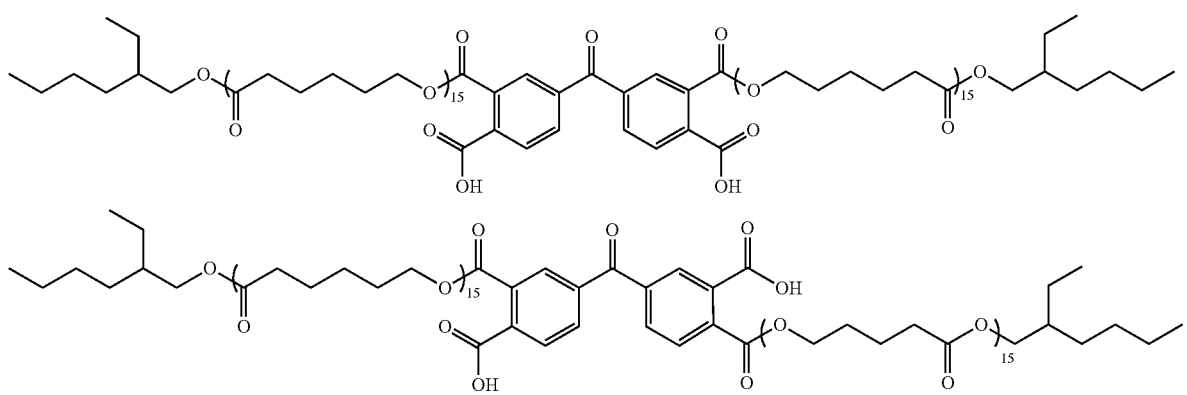
Reaction Product 12
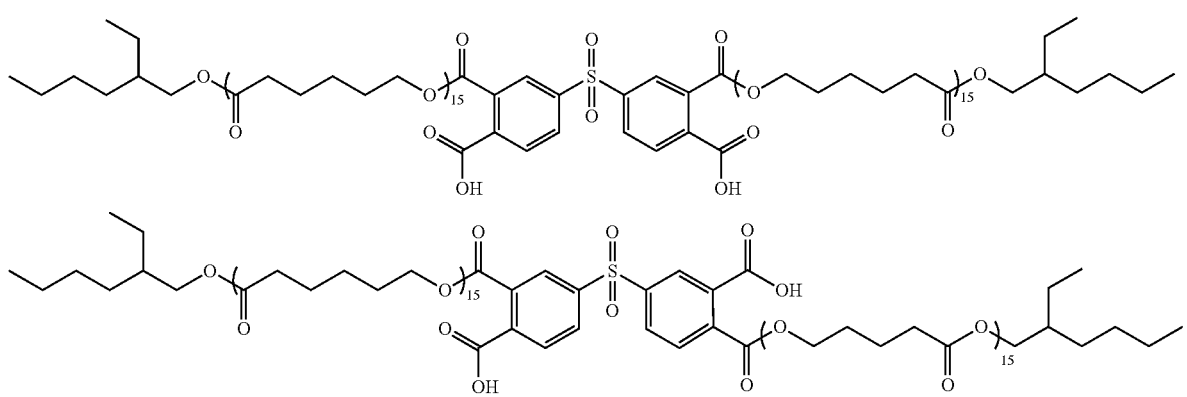
Reaction Product 13
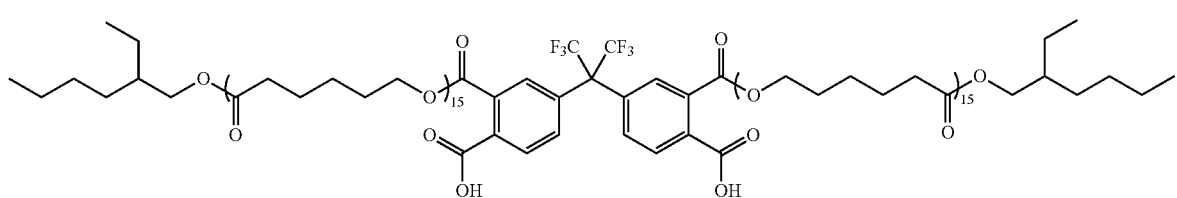
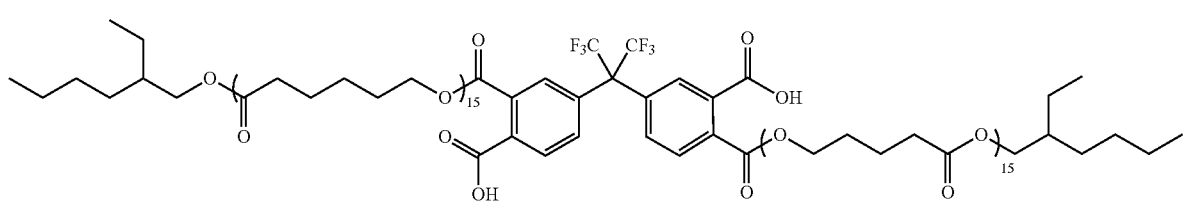

9. A coating composition,
which is a coating composition for a magnetic recording medium, and
comprises:
ferromagnetic powder;
binder;
solvent; and
a compound denoted by Formula (1):

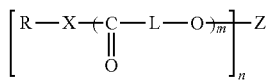

Formula (1)

wherein, in Formula (1),
X denotes —O—, —S—, or $NR^1$—;
R denotes a hydrogen atom or a monovalent substituent selected from the group consisting of the following monovalent substituents, in which "*" denotes the position of the bond with X:

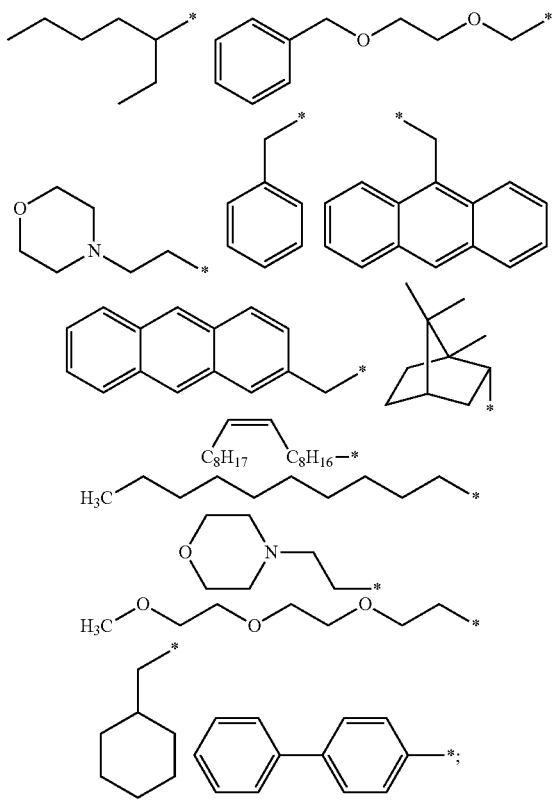

$R^1$ denotes a hydrogen atom or a monovalent substituent selected from the group consisting of an alkyl group with 1 to 6 carbon atoms, a hydroxyl group, an alkoxy group with 1 to 6 carbon atoms, a halogen atom, a cyano group, an amino group, a nitro group, an acyl group, and a carboxyl (salt) group;
L denotes a divalent connecting group which is a linear, branched, or cyclic alkylene group having 1 to 12 carbon atoms;
Z denotes a partial structure of valence n comprising at least one group selected from the group consisting of carboxyl groups and carboxylate groups, and which is a reactive residue of a carboxylic acid anhydride;

m denotes an integer of greater than or equal to 2,
n denotes an integer of greater than or equal to 1, and
the weight average molecular weight of the compound denoted by Formula (1) falls within a range of greater than or equal to 1,000 but less than 20,000.

10. The coating composition according to claim 9, wherein, in Formula (1), X denotes —O—.

11. The coating composition according to claim 9, wherein, in Formula (1), Z denotes a reactive residue of tetracarboxylic acid anhydride.

12. The coating composition according to claim 9, wherein a weight average molecular weight of the binder ranges from 20,000 to 120,000.

13. The coating composition according to claim 9, wherein an average particle size of the ferromagnetic powder ranges from 10 nm to 50 nm.

14. The coating composition according to claim 9, which comprises the compound denoted by Formula (1) in a content ranging from 0.5 weight part to 50.0 weight parts per 100.0 weight parts of ferromagnetic powder.

15. The coating composition according to claim 9, wherein the binder is selected from the group consisting of polyurethane resin and vinyl chloride resin.

16. The coating composition according to claim 9, wherein Z is selected from the group consisting of the following structures:

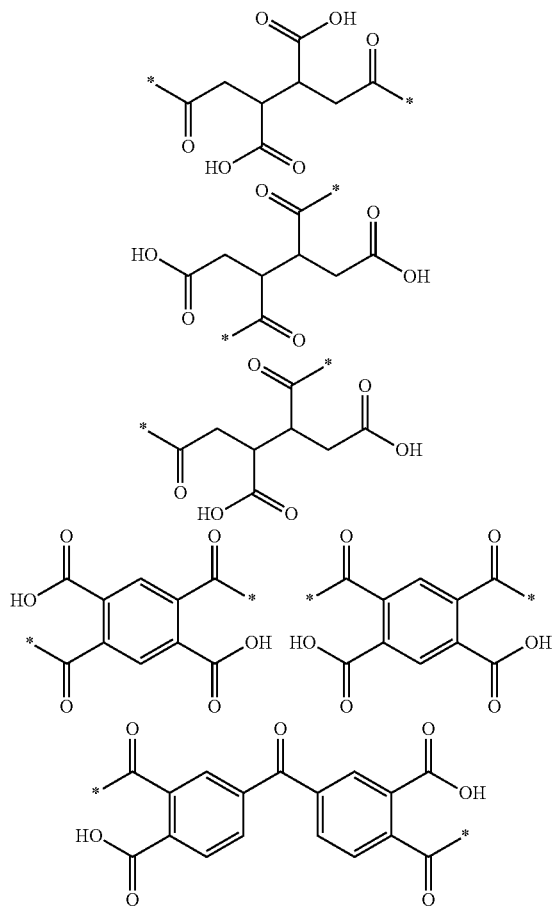

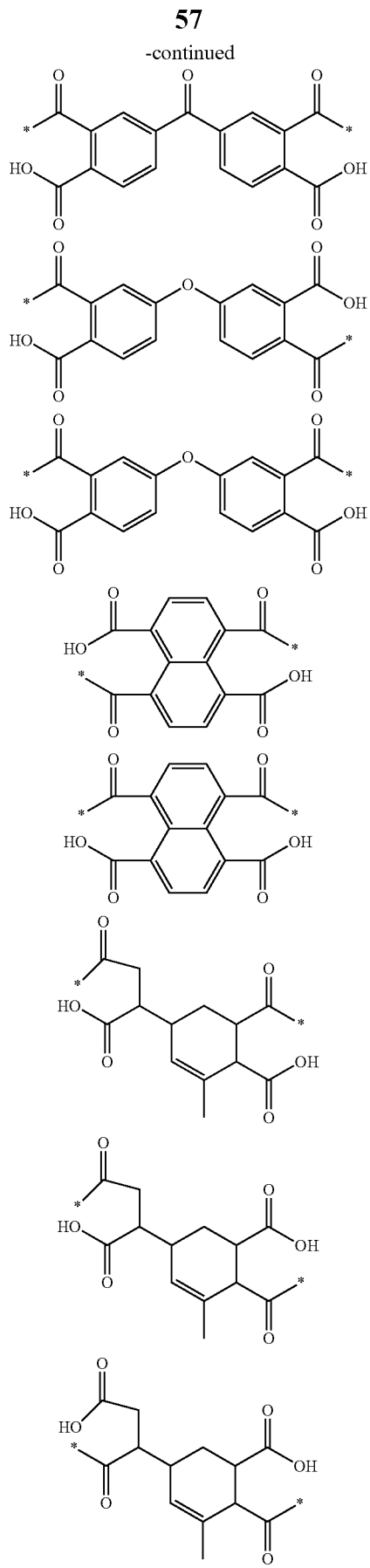
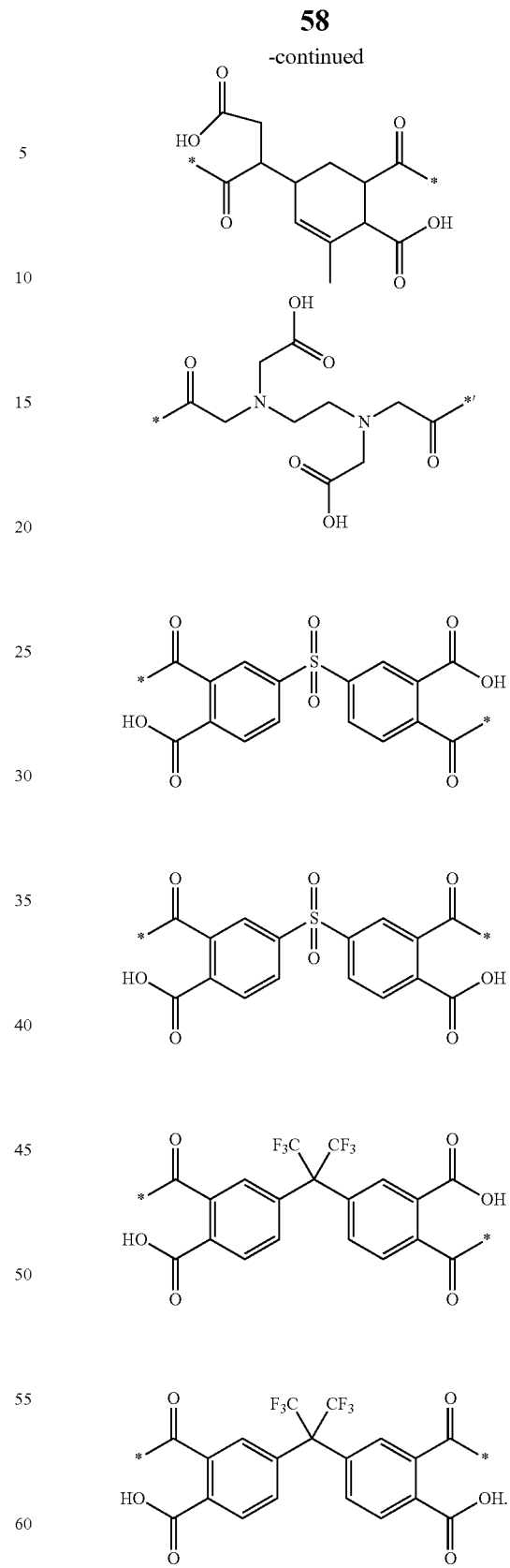
17. The coating composition according to claim 9, wherein the compound denoted by Formula (1) comprises at least one selected from the group consisting of Reaction Products 1 to 13 shown below:

Reaction Product 1
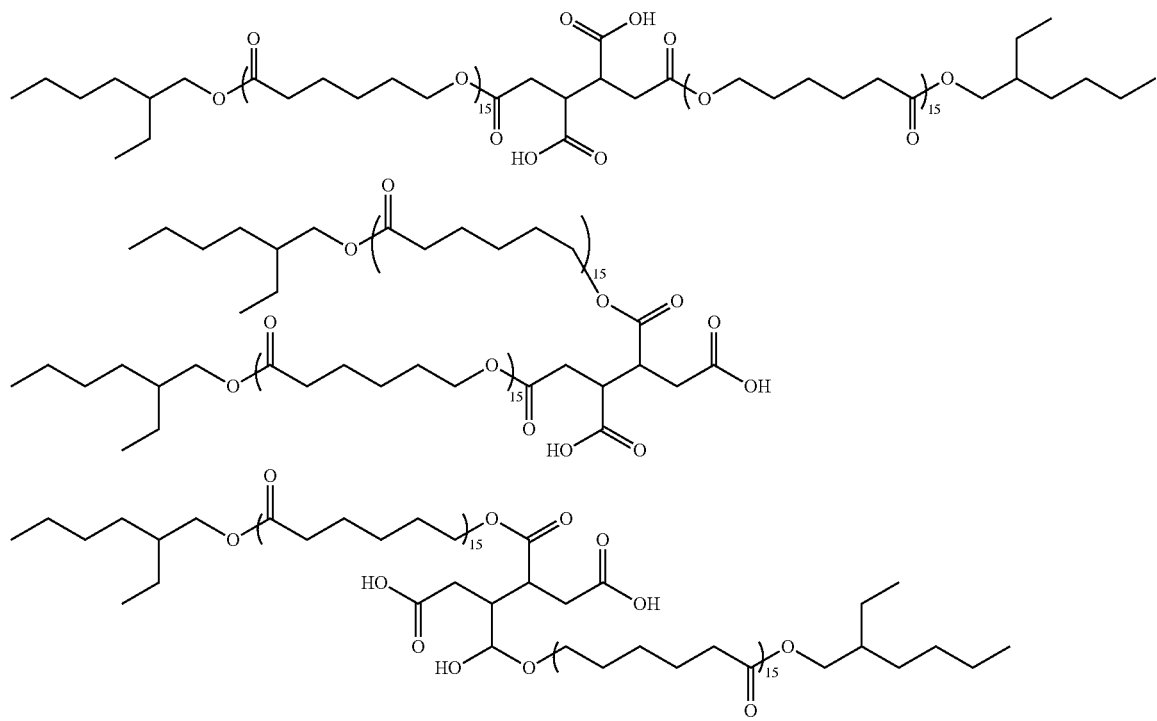
Reaction Product 2
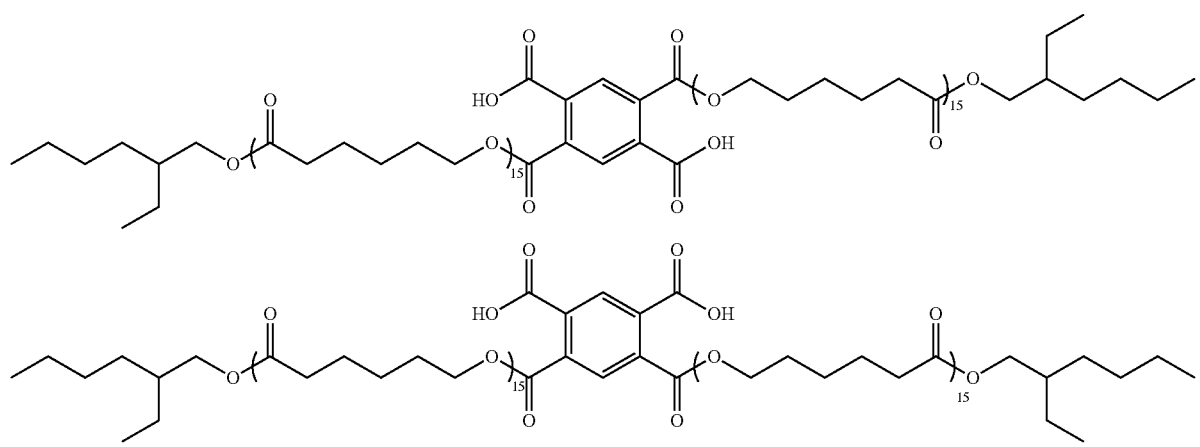
Reaction Product 3
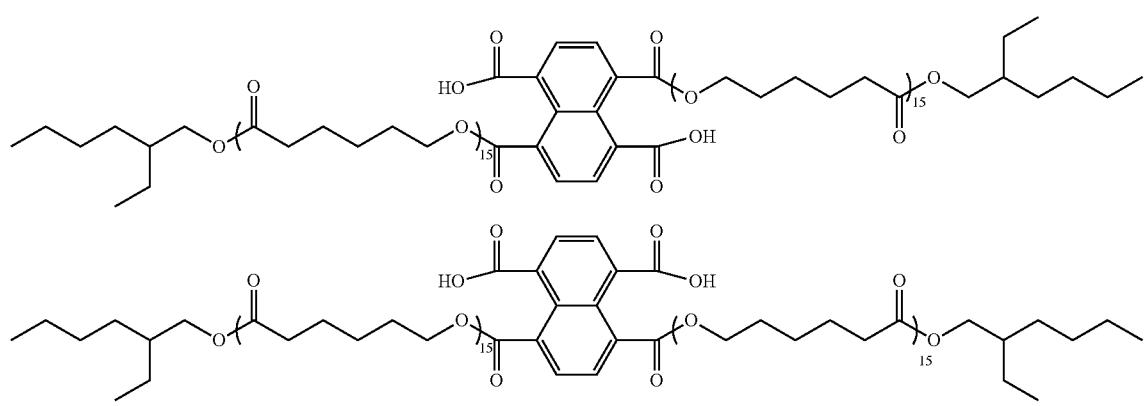

-continued
Reaction Product 4
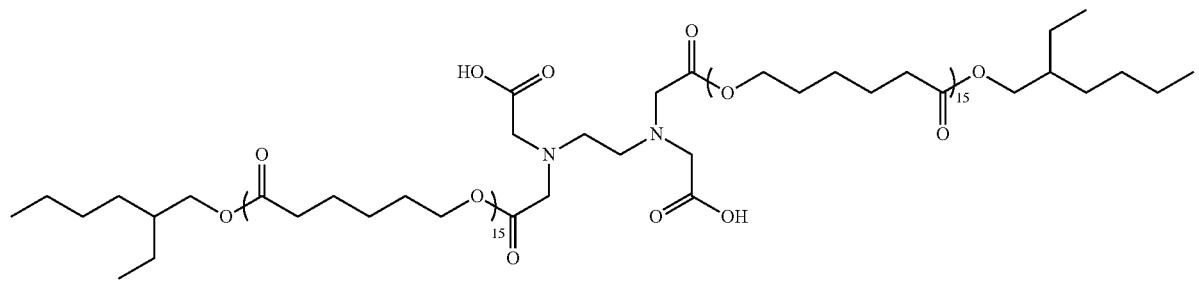
Reaction Product 5
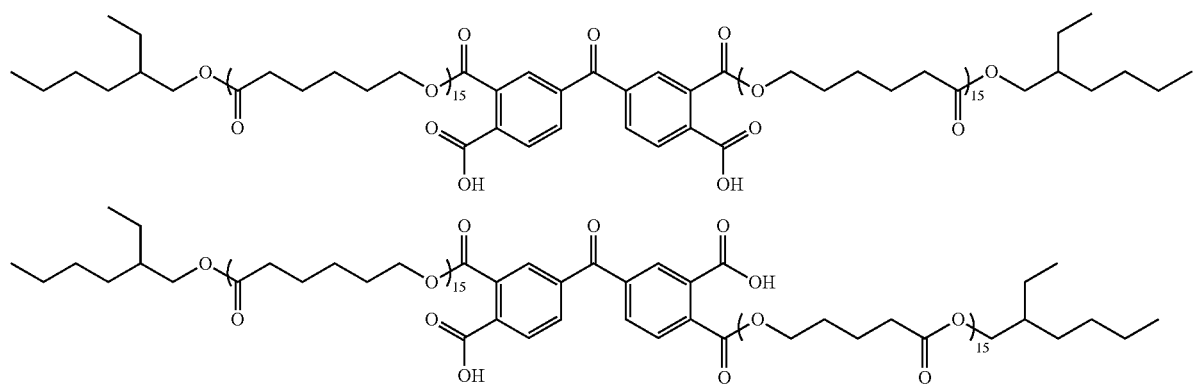
Reaction Product 6
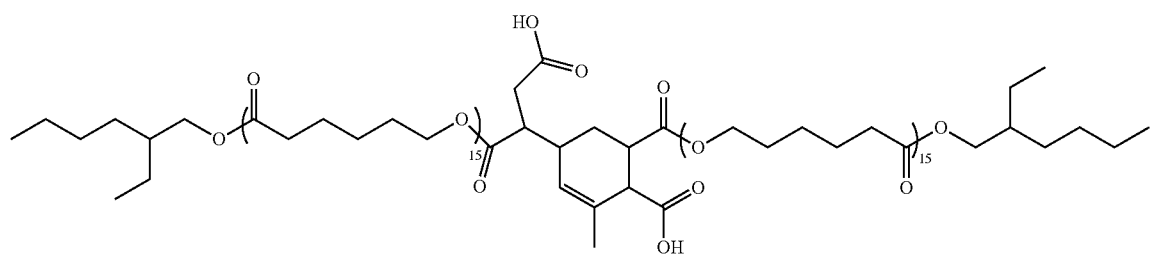
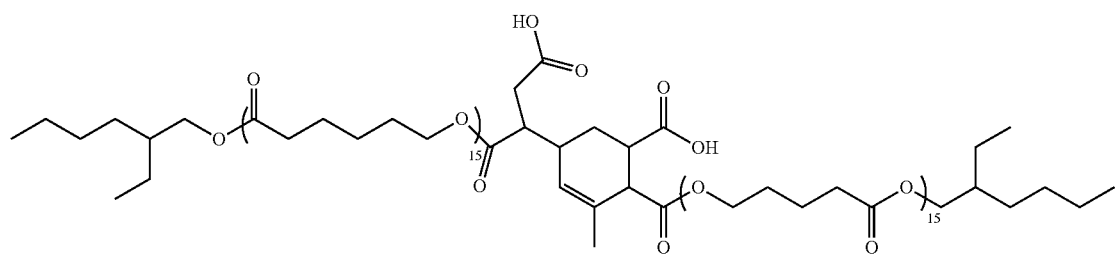
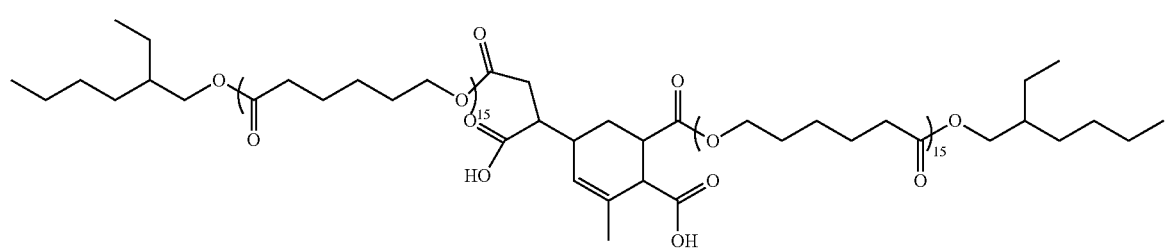

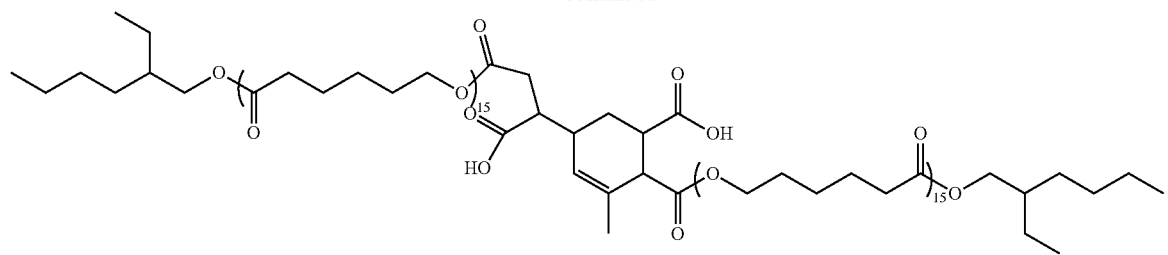
Reaction Product 7
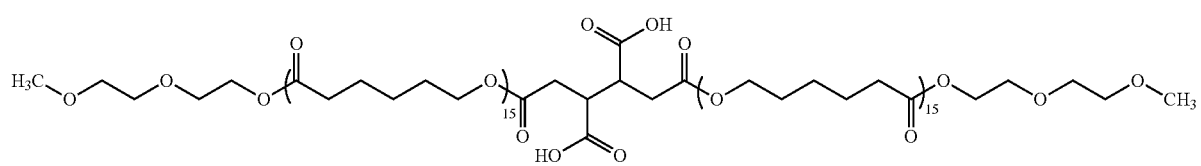
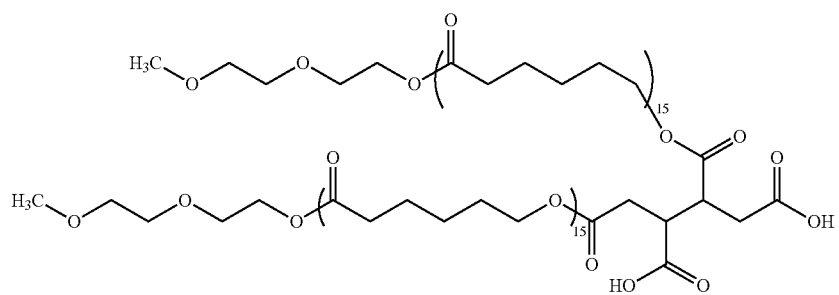
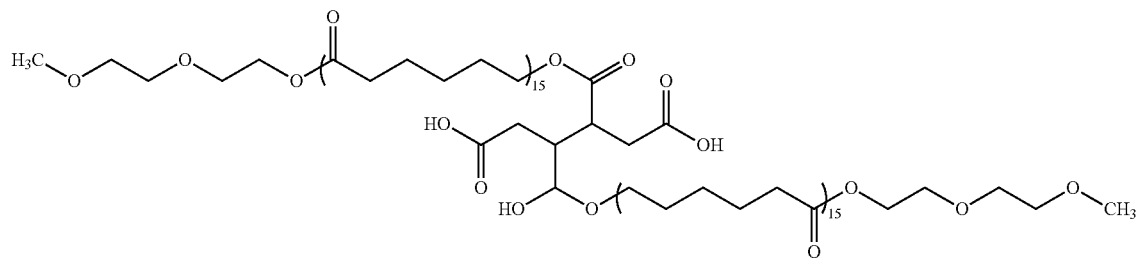
Reaction Product 8
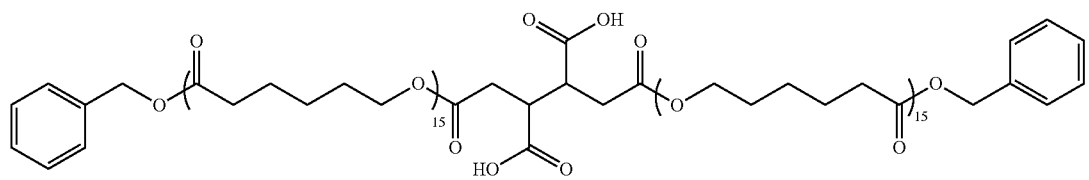
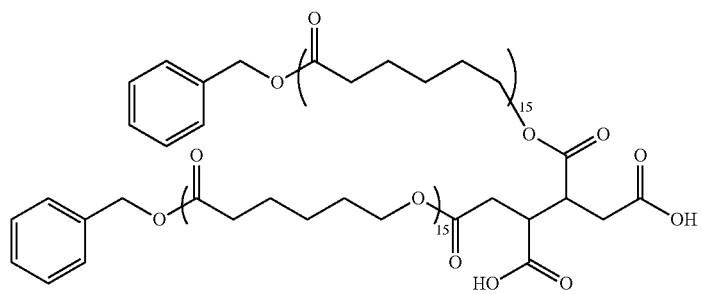

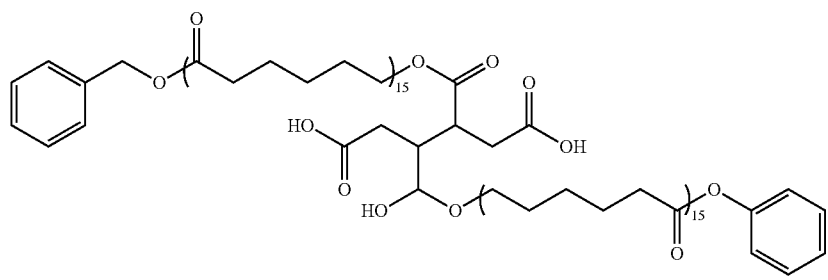
Reaction Product 9
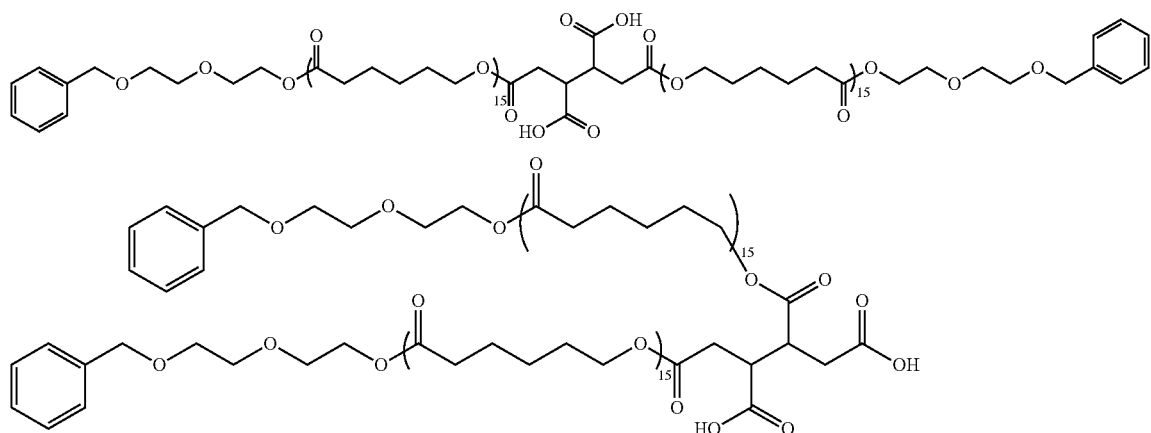
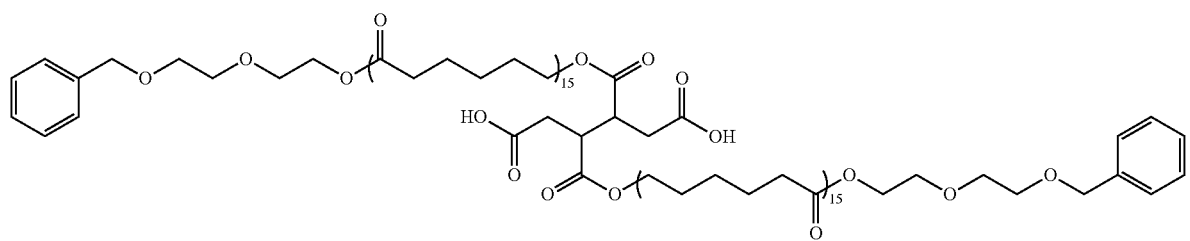
Reaction Product 10
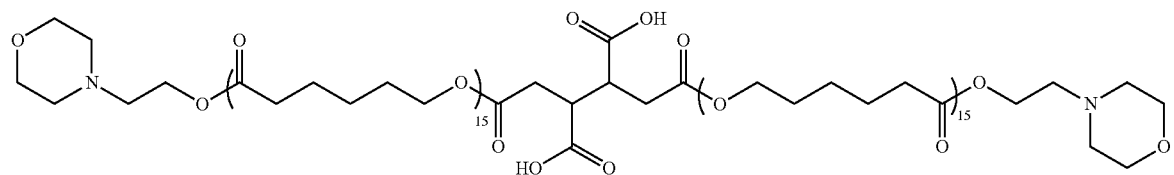
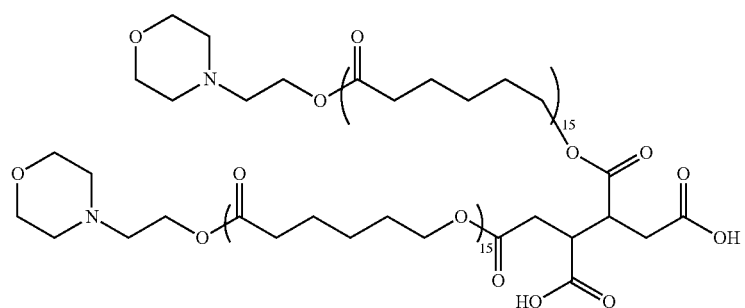

-continued
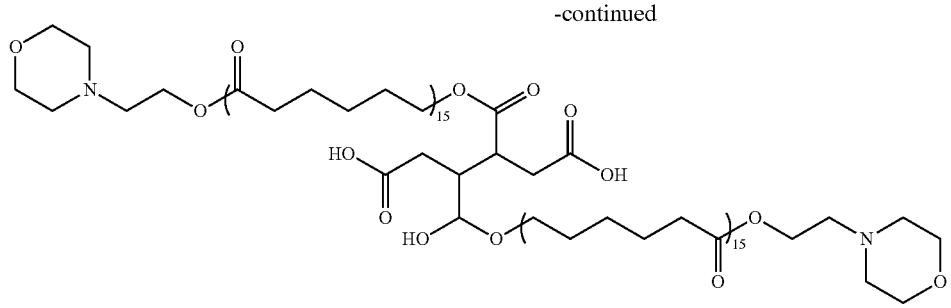
Reaction Product 11
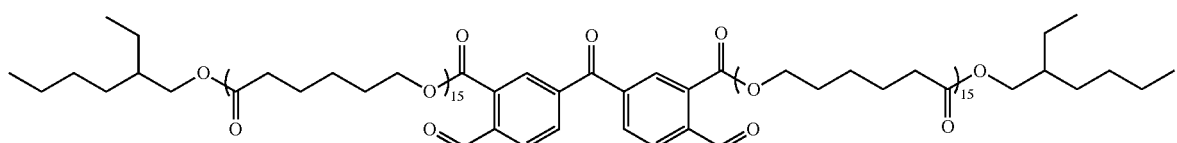
Reaction Product 12
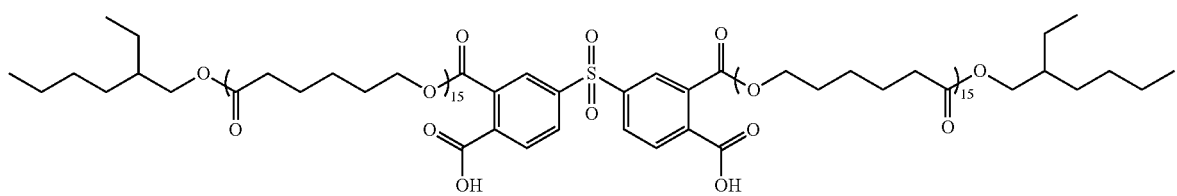
Reaction Product 13
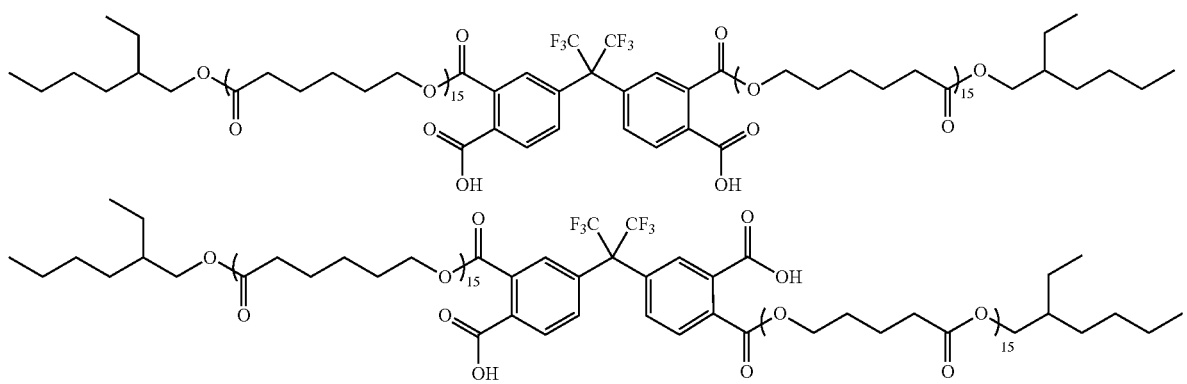
* * * * *